(12) United States Patent
Burmester et al.

(10) Patent No.: US 12,357,981 B2
(45) Date of Patent: Jul. 15, 2025

(54) PARTICULATE FILTERS

(71) Applicant: JOHNSON MATTHEY PUBLIC LIMITED COMPANY, London (GB)

(72) Inventors: Sabina Burmester, Royston (GB); Thomas Hotchkiss, Royston (GB); David Marvell, Royston (GB); Jonathon Paul Sapsford, Royston (GB)

(73) Assignee: Johnson Matthey Public Limited Company, London (GB)

( * ) Notice: Subject to any disclaimer, the term of this patent is extended or adjusted under 35 U.S.C. 154(b) by 124 days.

(21) Appl. No.: 17/649,730

(22) Filed: Feb. 2, 2022

(65) Prior Publication Data

US 2022/0258150 A1     Aug. 18, 2022

Related U.S. Application Data

(60) Provisional application No. 63/200,075, filed on Feb. 12, 2021.

(51) Int. Cl.
| | |
|---|---|
| *B01J 37/02* | (2006.01) |
| *B01D 46/00* | (2022.01) |
| *B01D 46/24* | (2006.01) |
| *B01J 35/31* | (2024.01) |
| *B01J 35/40* | (2024.01) |
| *B01J 35/56* | (2024.01) |
| *B01J 37/03* | (2006.01) |
| *B01J 37/08* | (2006.01) |
| *F01N 3/035* | (2006.01) |

(52) U.S. Cl.
CPC ...... *B01J 37/0217* (2013.01); *B01D 46/0001* (2013.01); *B01D 46/0027* (2013.01); *B01D 46/24* (2013.01); *B01J 35/31* (2024.01); *B01J 35/40* (2024.01); *B01J 35/56* (2024.01); *B01J 37/038* (2013.01); *B01J 37/082* (2013.01); *F01N 3/035* (2013.01); *B01D 2279/30* (2013.01); *F01N 2510/06* (2013.01)

(58) Field of Classification Search
CPC ...... F01N 3/0222; F01N 9/002; F01N 11/002; F01N 2310/06; F01N 1330/06; F01N 2330/30; F01N 2330/34; F01N 2330/36; F01N 2900/1406; B01D 46/2418; B01D 46/2425; B01D 2201/32; B01D 2201/62; B01D 2323/10; C04B 38/0006; C04B 2111/00793

See application file for complete search history.

(56) References Cited

U.S. PATENT DOCUMENTS

| | | | |
|---|---|---|---|
| 2005/0161158 A1* | 7/2005 | Schumacher | ....... C23C 16/4412 156/345.29 |
| 2011/0229634 A1* | 9/2011 | Tsuji | ...................... C04B 41/87 427/181 |
| 2011/0262639 A1 | 10/2011 | Sato | |
| 2021/0239018 A1* | 8/2021 | Deibel | .................. F01N 3/0842 |

FOREIGN PATENT DOCUMENTS

| | | | | |
|---|---|---|---|---|
| CN | 112096486 | A | 12/2020 | |
| CN | 114146733 | A | 3/2022 | |
| EP | 2371451 | A1 | 10/2011 | |
| EP | 3869018 | A1 | 8/2021 | |
| EP | 4043705 | B1 | 12/2023 | |
| JP | H10249124 | A | 9/1998 | |
| JP | H10263340 | A | 10/1998 | |
| JP | 2011224514 | A | 11/2011 | |
| WO | 2019215208 | A1 | 11/2019 | |
| WO | WO-2019211373 | A1 * | 11/2019 | ......... B01D 46/2418 |
| WO | 2022171999 | A1 | 8/2022 | |

OTHER PUBLICATIONS

UK Intellectual Property Office Online Patent Information & Document Inspection Service (Ipsum) Case Details for Application No. GB1911704.3. Retrieved from https://www.ipo.gov.uk/p-ipsum/Case/ApplicationNumber/GB1911704.3 on Oct. 3, 2023. (Year: 2023).*

* cited by examiner

*Primary Examiner* — William P Fletcher, III

(57) ABSTRACT

Methods for treating a filter for filtering particulate matter from exhaust gas are disclosed in which a dry powder is sprayed towards an inlet face of the filter entrained in a primary flow of gas to pass through the inlet face to contact a porous structure of the filter. The back pressure of the filter is monitored during spraying of the dry powder and the spraying of the dry powder is stopped when the back pressure of the filter reaches a required value. The required value may equal an absolute back pressure, or a predetermined target back pressure for the filter minus an offset pressure, or an estimated back pressure of the filter.

17 Claims, 10 Drawing Sheets

PARTICULATE FILTERS

The present disclosure relates to improvements in or relating to particulate filters for filtering particulate matter from exhaust gas. In particular, the invention relates to methods of coating a filter comprising a porous substrate having inlet surfaces and outlet surfaces, wherein the inlet surfaces are separated from the outlet surfaces by a porous structure. The filter may be a wall-flow filter.

BACKGROUND TO THE DISCLOSURE

There are concerns about emissions of particulate matter (PM), commonly referred to as soot, from internal combustion engines and especially from diesel and gasoline engines in automotive applications. The main concerns are associated with potential health effects, and, in particular, with very tiny particles having sizes in the nanometer range.

Diesel particulate filters (DPFs) and gasoline particulate filters (GPFs) have been fabricated using a variety of materials including sintered metal, ceramic or metal fibres etc., with the most common type in actual mass production being the wall-flow kind made from porous ceramic material fabricated in the form of a monolithic array of many small channels running along the length of the body. Alternate channels are plugged at one end, so the exhaust gas is forced through the porous ceramic channel walls that prevent most of the particulate from passing through so only filtered gas enters the environment. Ceramic wall-flow filters in commercial production include those made from cordierite, various forms of silicon carbide and aluminium titanate. The actual shape and dimensions of practical filters on vehicles as well as properties such as the channel wall thickness and its porosity etc. depend on the application concerned. The average dimensions of the pores in the filter channel walls of a ceramic wall-flow filter through which the gas passes are typically in the range 5 to 50 µm and usually about 20 µm. In marked contrast, the size of most diesel particulate matter from a modern passenger car high speed diesel engine is very much smaller, e.g. 10 to 200 nm.

Some PM may be retained within the pore structure in the filter walls and this may in some applications gradually build up until the pores are bridged over by a network of PM and this PM network then enables the easy formation of a cake of particulate on the internal walls of the filter channels. The particulate cake is an excellent filter medium and its presence affords very high filtration efficiency. In some applications soot is burned continuously on the filter as it is deposited which prevents a particulate cake from building up on the filter.

For some filters, for example light duty diesel particulate filters, it is periodically necessary to remove trapped PM from the filter to prevent the build-up of excessive back pressure that is detrimental to engine performance and can cause poor fuel economy. So, in diesel applications, retained PM is removed from the filter by burning it in air in a process during which the amount of air available and the amount of excess fuel used to achieve the high temperature needed to ignite the retained PM are very carefully controlled. Towards the end of this process, that is usually called regeneration, the removal of the last remaining particulate in the filter can lead to a marked decrease in filtration efficiency and release of a burst of many small particles into the environment. Thus, filters may have low filtration efficiency when they are first used and subsequently after each regeneration event and also during the latter part of each regeneration process.

Thus, it would be desirable to improve and or maintain filtration efficiency at all times—for example during the early life of a filter when it is first used, and or during regeneration and immediately afterwards, and or when the filter is loaded with soot.

Liu, X., Szente, J., Pakko, J., Lambert, C. et al., "Using Artificial Ash to Improve GPF Performance at Zero Mileage," SAE Technical Paper 2019-01-0974, 2019, doi: 10.4271/2019-01-0974 describes a process for loading a bare filter substrate with submicron alumina particles generated by an atomizer to fabricate an "artificial ash" coating to reduce soot emission during cold start conditions. The process consists of generating aerosol particles by atomizing a liquid suspension with compressed air, drying the resulting ash containing droplets by flowing them through an oven, and loading the dried ash particles into the filter via their capture by filtration. The process utilises a high capacity atomizer (model PLG-2100, PALAS, Germany) to provide 100 l/min flow rate for full size bricks. Loading of the filter is monitored by the pressure drop across the filter and PM concentration before and after the filter recorded by a DustTrak aerosol monitor (TSI Inc, Minnesota, USA). While said process shows a reduction in soot emissions during cold start conditions, it is limited to substances that can be spray dried, requires an atomizer, drying oven and aerosol monitor and the artificial ash loading conditions may be constrained by the conditions necessary to achieve complete drying of the liquid aerosol before it reaches the filter substrate.

WO2011/151711 describes a method of making a filter for filtering particulate matter from exhaust gas emitted from a lean-burn internal combustion engine. The filter comprises a porous substrate having inlet surfaces and outlet surfaces, wherein the inlet surfaces are separated from the outlet surfaces by a porous structure containing pores of a first mean pore size. The inlet surfaces comprise a bridge network comprising interconnected particles of refractory material over the pores of the porous structure. The method comprises the step of contacting inlet surfaces of the filter substrate with an aerosol comprising refractory material in dry powder form. While said process shows a reduction in PM emissions for filters when first used and subsequently after each regeneration event, it would be desirable to provide an improved process, in particular, with respect to the controllability of the parameters of the filter produced.

US2019/0048771 describes engine exhaust particulate filters including a porous substrate having thereon inert nanoparticles at a concentration ranging from 0.01 g/L to 60 g/L relative to a filter volume of the substrate, a portion of the nanoparticles arranged to form regeneration resistant porous structures configured to capture particulates from an exhaust gas stream. While said filters purport to provide an improvement in the zero-mileage efficiency of particulate filters it would be desirable to provide an improved process, in particular, to improve controllability and flexibility of the process.

The present applicant has discovered (as described fully in their application GB1911704 filed 15 Aug. 2019, which is hereby incorporated by reference in its entirety) that a filter having improved filtration efficiency during the early life of the filter when it is first used, and or during regeneration and immediately afterwards, and or when the filter is loaded with soot may be obtained by a method of treatment that comprises the steps of:

a) containing a dry powder in a reservoir;

b) locating a filter in a filter holder, the filter comprising a porous substrate having an inlet face and an outlet face, the inlet face and the outlet face being separated by a porous structure;

c) establishing a primary gas flow through the porous structure of the filter by applying a pressure reduction to the outlet face of the filter;
d) transferring the dry powder from the reservoir to a spray device located upstream of the inlet face of the filter; and
e) spraying the dry powder, using the spray device, towards the inlet face of the filter such that the dry powder is entrained in the primary gas flow and passes through the inlet face of the filter to contact the porous structure.

In GB1911704 the present applicant describes how the dry powder may preferably comprise one or more of fumed alumina, fumed silica, fumed titania, silica aerogel, alumina aerogel, carbon aerogel, titania aerogel, zirconia aerogel or ceria aerogel. In particular, examples of filters are described which have been coated with a fumed aluminium oxide having a tapped density of 0.05 g/l and d50 of 5.97 microns.

While this method of treatment has been found to produce filters with improved filtration efficiency characteristics there is still a desire to further improve the treatment of such filters, in particular, to improve the durability of the treated filters.

Consequently, the present applicant has discovered (as described fully in their application GB2002483 filed 21 Feb. 2020, which is hereby incorporated by reference in its entirety) that the durability of the treated filters may be improved by using a dry powder in the spraying process that comprises or consists of a metal compound for forming by thermal decomposition a metal oxide.

In GB2002483 the present applicant describes how it has been that the use of a metal compound that decomposes thermally into a metal oxide as the dry powder may produce substantial improvements in the durability of the treated filter compared to treatment with metal oxides including, for example, fumed aluminium oxide, especially in the ability of the dry powder to remain adhered to the porous structure and resist being de-adhered from the porous structure during subsequent operation of the filter.

Surprisingly, the present applicant has discovered that improved adhesion of these dry powders may be achieved without the presence of any additional binder or adhesion promotor or the need for any high-temperature sintering of the filter. In particular, it has been surprisingly found that the use of such dry powders may result in good adhesion while maintaining high filtration efficiencies and with acceptable cold flow back pressures.

While the methods of treatment of GB1911704 and GB2002483 have been found to be effective in producing improved filters there is still a desire to improve the methods.

SUMMARY OF THE DISCLOSURE

In a first aspect the present disclosure provides a method for treating a filter for filtering particulate matter from exhaust gas, the method comprising the steps of:

a) containing a dry powder in a reservoir;
b) locating a filter in a filter holder, the filter comprising a porous substrate having an inlet face and an outlet face, the inlet face and the outlet face being separated by a porous structure;
c) establishing a primary gas flow through the porous structure of the filter by applying a pressure reduction to the outlet face of the filter;
d) transferring the dry powder from the reservoir to a spray device located upstream of the inlet face of the filter;
e) spraying the dry powder, using the spray device, towards the inlet face of the filter such that the dry powder is entrained in the primary gas flow and passes through the inlet face of the filter to contact the porous structure; and
f) monitoring a back pressure of the filter during at least step e) and stopping the spraying of the dry powder towards the inlet face of the filter when:

$$p_{BP} \geq p_{target} - p_{offset}$$

where, $p_{BP}$ is the back pressure of the filter;

$p_{target}$ is a pre-determined target back pressure for the filter; and $p_{offset}$ is a pre-chosen offset pressure.

Beneficially, the method may allow the back pressure of the filters produced to be more closely conformed to a pre-determined target back pressure. The method may help to limit any overshoot of the target back pressure and reduce the occurrence of overshoot of the target back pressure.

The pre-determined target back pressure for the filter, $p_{target}$, may be an absolute back pressure of the filter. For example, the pre-determined target back pressure for the filter, $p_{target}$, may be a target back pressure of 20-180 mbar. Alternatively, the pre-determined target back pressure for the filter, $p_{target}$, may be a relative back pressure of the filter. For example, the pre-determined target back pressure for the filter, $p_{target}$, may be a back pressure that is relative to an initial back pressure of the filter before spraying of the dry powder. For example, the pre-determined target back pressure for the filter, $p_{target}$, may be 105% to 200%, optionally 125% to 150% of the initial back pressure of the filter.

In step f), the spraying of the dry powder towards the inlet face of the filter may be stopped when $p_{BP} \geq p_{target} - p_{offset}$ is true for a minimum time period, $t_{min}$, wherein $t_{min} \geq 0.1$ s, optionally ≥0.5 s, optionally ≥1.0 s. In this way the method may be configured to avoid stopping of the spraying due to short-term fluctuations in the back pressure reading that may, for example, be due to system noise and not reflect a true back pressure of the filter.

The $p_{offset}$ may be, for example 1-10 mbar, optionally 2-5 mbar, optionally 3-5 mbar. For example, such a $p_{offset}$ may be used in cases where the $p_{target}$ is 20-180 mbar.

In step f), the back pressure of the filter may be monitored continuously during at least step e). Optionally the back pressure may be continuously monitored by measuring the back pressure at a sample rate of ≥1 samples·s$^{-1}$, optionally ≥5 samples·s$^{-1}$, optionally ≥10 samples·s$^{-1}$.

The method may further comprise in step c), monitoring a back pressure of the filter and passing the primary gas flow through the porous structure of the filter until the back pressure of the filter is stable before starting step d). In this way a more accurate and reliable measure of the initial back pressure of the filter may be obtained. In addition, such a stable back pressure may also be indicative of obtaining a stable flow of the primary gas flow through the porous structure of the filter. The pre-determined target back pressure for the filter, $p_{target}$, may be relative to the stable back pressure monitored in step c). For example, the pre-determined target back pressure for the filter, $p_{target}$, may be 105% to 200%, optionally 125% to 150% of the stable back pressure monitored in step c).

The method may further comprise the step of monitoring the back pressure of the filter and maintaining the primary gas flow through the porous structure of the filter after the spraying of the dry powder has been stopped until the back pressure of the filter is stable. This may improve the ability to determine that a correct cold flow back pressure (CFBP) for the filter has been obtained.

The back pressure of the filter may be considered stable when:
i) the primary gas flow rate is within 0.5% of a predetermined flow rate;
ii) the first derivative of the primary gas flow rate is $\leq \pm 0.15$ m$^3$ hr$^{-1}\cdot$s$^{-1}$; and
iii) the first derivative of the back pressure of the filter is $\leq \pm 1.5$ mbar$\cdot$s$^{-1}$.

The back pressure, $p_{BP}$, may be an absolute back pressure measured relative to atmospheric pressure.

The method may use a coating apparatus for carrying out at least steps a) to f), wherein the pre-determined target back pressure, $p_{target}$, for the filter may be calculated by:
choosing a desired back pressure for the filter as would be measured by a testing apparatus different to the coating apparatus;
establishing a calibration map for converting back pressures measured on the testing apparatus to back pressures measured on the coating apparatus; and
converting the desired back pressure using the calibration map to establish the pre-determined target back pressure, $p_{target}$.

Beneficially, the use of a calibration map in this way may allow the final back pressure of the filter to be targeted at a figure as it would be measured on the testing apparatus without having to use that testing apparatus during the coating process of the filter. This can be advantageous because the back pressure of a filter will typically be measured by a purchaser of the filter on their own testing apparatus to confirm that the filter meets their requirements. For example the purchaser may test the filter on a testing apparatus such as a Superflow Flow Bench 1050 available from Superflow of Sussex, WI, USA. The requirement may be for the filter to have a back pressure of, for example, 65 mbar±5 mbar when tested on the Superflow Flow Bench 1050. The use of the calibration map may allow the pre-determined target back pressure, $p_{target}$ as measured by the coating apparatus to be selected in order to achieve the required back pressure on the Superflow Flow Bench 1050.

In a second aspect the present disclosure provides a method for treating a filter for filtering particulate matter from exhaust gas, the method comprising the steps of:
a) containing a dry powder in a reservoir;
b) locating a filter in a filter holder, the filter comprising a porous substrate having an inlet face and an outlet face, the inlet face and the outlet face being separated by a porous structure;
c) establishing a primary gas flow through the porous structure of the filter by applying a pressure reduction to the outlet face of the filter while monitoring a back pressure of the filter, and passing the primary gas flow through the porous structure of the filter until the back pressure of the filter is stable;
d) subsequently to establishing the stable back pressure of the filter, transferring the dry powder from the reservoir to a spray device located upstream of the inlet face of the filter;
e) spraying the dry powder, using the spray device, towards the inlet face of the filter such that the dry powder is entrained in the primary gas flow and passes through the inlet face of the filter to contact the porous structure while monitoring the back pressure of the filter;
f) stopping the spraying of the dry powder towards the inlet face of the filter; and
g) continuing to monitor the back pressure of the filter while maintaining the primary gas flow through the porous structure of the filter after the spraying of the dry powder has been stopped until the back pressure of the filter is stable.

The back pressure of the filter may be considered stable when the first derivative of the primary gas flow rate is $\leq \pm X$ m$^3$ hr$^{-1}\cdot$s$^{-1}$, wherein X=0 to 0.30, optionally X=0.10 to 0.20, X=0.15.

Additionally or alternatively, the back pressure of the filter may be considered stable when the first derivative of the back pressure of the filter is $\leq \pm Y$ mbar$\cdot$s$^{-1}$, wherein Y=0.5 to 3.0, optionally Y=1.0 to 2.0, optionally Y=1.5.

Additionally or alternatively, the back pressure of the filter may be considered stable when the primary gas flow rate is within Z % of a predetermined flow rate, wherein Z=1.5, optionally Z=1.0, optionally Z=0.5.

The back pressure may be an absolute back pressure measured relative to atmospheric pressure. The back pressure of the filter may be measured using a pressure sensor; optionally a single pressure sensor that is located in a filter holder or other housing fluidly connected to the outlet face of the filter.

In a third aspect the present disclosure provides a method for treating a filter for filtering particulate matter from exhaust gas, the method comprising the steps of:
a) containing a dry powder in a reservoir;
b) locating a filter in a filter holder, the filter comprising a porous substrate having an inlet face and an outlet face, the inlet face and the outlet face being separated by a porous structure;
c) establishing a primary gas flow through the porous structure of the filter by applying a pressure reduction to the outlet face of the filter;
d) transferring the dry powder from the reservoir to a spray device located upstream of the inlet face of the filter;
e) spraying the dry powder, using the spray device, towards the inlet face of the filter such that the dry powder is entrained in the primary gas flow and passes through the inlet face of the filter to contact the porous structure; and
f) monitoring a back pressure of the filter during at least step e) and stopping the spraying of the dry powder towards the inlet face of the filter when:

$$p_{est} \geq p_{target}$$

where,
$p_{target}$ is a pre-determined target back pressure for the filter; and
$p_{est}$ is an estimated final back pressure of the filter;
wherein $p_{est}$ is calculated by extrapolation of measured back pressure data for the filter that is obtained during step f).

Beneficially, the method may allow the back pressure of the filters produced to be more closely conformed to a pre-determined target back pressure. The method may help to limit any overshoot of the target back pressure and reduce the occurrence of overshoot of the target back pressure. In particular, the method may allow better conformation of the back pressure to the pre-determined target back pressure for filters that have different loading characteristics to each other. For example, different filters (even within one batch of filters) may exhibit different rates of change in back pressure when loaded with dry powder. The method of the third aspect may help to accommodate for the different loading characteristics by use of the estimated final back pressure parameter which may be calculated for each individual filter. Consequently, the method may enable filters to be produced with a low variation in the CFBP of the filters.

The estimated final back pressure of the filter, $p_{est}$, may be calculated by extrapolating the measured back pressure data forwards in time for $T_s$ seconds, where $T_s$ is a settling time.

The method may be performed on a coating apparatus and the settling time, $T_s$, may be a coating apparatus-dependent variable and may be preferably independent of the filter.

For example, the settling time for the coating apparatus may be affected by design aspects of the coating apparatus, for example valve closing times, the rate of powder spraying, the size of the flow conduit, any lag on the pressure measurement by the pressure sensor, etc. Thus, the parameter of the setting time, $T_s$, may be chosen to characterise the performance of the coating apparatus. The setting time, $T_s$, may be calculated theoretically for a coating apparatus. Alternatively, the setting time, $T_s$, may be determined experimentally for a coating apparatus by testing sample filters.

The estimated final back pressure of the filter, $p_{est}$, may be calculated by curve-fitting the measured back pressure data and extrapolating the fitted curve forwards in time.

Any of the above aspects may additionally comprises one or more of the following features:

The dry powder may, in some examples, comprise or consist of one or more refractory powders, preferably comprising one or more fumed refractory powders, and or one or more aerogels. The one or more fumed refractory powders may be produced by a pyrogenic process, for example flame pyrolysis. The one or more fumed refractory powders may comprise one or more of fumed alumina, fumed silica, fumed titania, other fumed metal oxide and fumed mixed oxides. The one or more aerogels may comprises one or more of silica aerogel, alumina aerogel, carbon aerogel, titania aerogel, zirconia aerogel, ceria aerogel, a metal oxide aerogel and mixed oxide aerogels.

In these examples the method may further comprise providing a maximum loading of the filter of <10 g/l of the dry powder, optionally <5 g/l of the dry powder, optionally <2 g/l of the dry powder. The dry powder may have a tapped density of less than 0.10 g/cm$^3$, optionally less than 0.08 g/cm$^3$, optionally less than 0.07 g/cm$^3$, optionally less than 0.06 g/cm$^3$, optionally less than 0.05 g/cm$^3$. The dry powder may have a d50 (by volume) less than 25 microns, preferably less than 20 microns, more preferably less than 10 microns.

In some other examples the dry powder may comprise or consist of a metal compound for forming by thermal decomposition a metal oxide. The dry powder may consist of a single metal compound of may consist of a mixture or blend or successive doses of two or more metal compounds. The or each metal compound may contain one or more metal cations. Where a plurality of metal cations is present these may be of the same or of different metals. The metal compound may comprise or consist of a metal hydroxide, a metal phosphate, a metal carbonate, a metal sulphate, a metal perchlorate, a metal iodide, a metal oxalate, a metal acetate, a metal chlorate or a mixture thereof. The metal of the metal compound may comprise or consist of one or more of magnesium, calcium, strontium, barium, aluminium, zirconium, manganese, lithium, iron, cobalt, nickel, copper, or gallium. The dry powder may additionally comprise a metal oxide or mixed metal oxide. Preferably the dry powder comprises 90 wt % or greater of the metal compound for forming by thermal decomposition a metal oxide and 10 wt % or less of the metal oxide or mixed metal oxide. More preferably the dry powder comprises 95 wt % or greater of the metal compound for forming by thermal decomposition a metal oxide and 5 wt % or less of the metal oxide or mixed metal oxide. Optionally the dry powder comprises 99 wt % or greater of the metal compound for forming by thermal decomposition a metal oxide and 1 wt % or less of the metal oxide or mixed metal oxide. The metal of the metal oxide or mixed metal oxide may comprise or consist of one or more of aluminium, magnesium, calcium, strontium, barium, aluminium, zirconium, manganese, lithium, iron, cobalt, nickel, copper, or gallium. Preferably the dry powder comprises or consists of a metal hydroxide, a metal phosphate, a metal carbonate or a mixture thereof. The metal hydroxide may be selected from the group consisting of magnesium hydroxide, calcium hydroxide, strontium hydroxide and barium hydroxide. The metal phosphate may be selected from the group consisting of magnesium phosphate, calcium phosphate, strontium phosphate and barium phosphate. The metal carbonate may be selected from the group consisting of magnesium carbonate, calcium carbonate, strontium carbonate and barium carbonate.

In these examples the method may further comprise providing a maximum loading of the filter of 10 to 40 g/l, optionally 15 to 30 g/l, optionally about 20 g/l. The dry powder may have a tapped density of 1 to 3 g/cm$^3$, optionally 1.5 to 2.5 g/cm$^3$, optionally about 2 g/cm$^3$. The dry powder may have a d50 (by volume) less than 10 microns, optionally less than 5 microns, optionally about 2 microns. Surprisingly, the present applicant has discovered that use of metal hydroxide, metal phosphate, and or metal carbonate powders with such a relatively small particle size may still produce an effective on-wall filtering layer on the wall of the porous substrate.

The dry powder may consist of a single powder type or a mixture of powder types.

The method may further comprise the step of calcining the filter. Calcining the filter may be carried out at a temperature selected to produce thermal decomposition of the dry powder in examples where the dry powder comprises or consists of a metal compound for forming by thermal decomposition a metal oxide. Preferably at least a majority of such dry powder, more preferably all or substantially all of the dry powder may be thermally decomposed during calcination. However, it will be understood that residual amounts of non-decomposed dry powder may remain after calcination.

The calcination temperature may be selected to be at least 150° C., optionally at least 250° C., optionally at least 500° C. In some embodiments it is preferred that the calcination temperature is no greater than 550° C. However, in other embodiments, the calcination temperature may be selected to be greater than 550° C. The calcination temperature may be selected to be up to 900° C., optionally up to 1150° C. In one example the calcination temperature may be selected to be between 300° C. and 500° C. In another example the calcination temperature may be selected to be about 520° C. In another example the calcination temperature may be selected to be about 580° C. In another example the calcination temperature may be selected to be about 900° C.

The calcination may be carried out for a period of 30 to 90 minutes, optionally 30 to 60 minutes. In one example the period is about 35 minutes. In another example the period is about 60 minutes. Within any such calcination, the dwell time of each filter is preferably 1 to 15 minutes, preferably 5 to 10 minutes.

By "calcination" herein is meant a process whereby the filter is fired, typically, though not exclusively, in air at a desired temperature for a desired length of time. It will be understood, however, that it is not generally possible to instantly raise the filter temperature to an indicated temperature, even using microwave assisted. Instead, the skilled person will understand that in a typical calcination process, the filter will be fed on a belt into a dynamic furnace or a pallet of filters will be installed in a static oven and in either case the furnace or oven temperature will be raised to a desired temperature; in the case of the furnace, this may be achieved by zones within the furnace increasing in temperature to the desired temperature. That is, it can take a period of time for the filter to be raised to the desired temperature. Therefore, the calcination temperatures defined herein refer to the preferred peak temperature at which the filter is calcined. The filter may ultimately reach and be held at the peak temperature for a relatively short period (a so-called "dwell time") of an entire calcination cycle. What Applicant's inventors have found is that the period of the dwell time is important to achieve the desired adherence of the powder to both itself and particularly to the porous structure of the filter. Therefore, by "calcination" herein is meant the entire period or cycle of the heating up, dwell time and cooling down of the firing process. Hence, the calcination process as a whole, including heat-up, dwell time and cool-down, might be 90 minutes long, but the dwell time may only be from 1 to 15 minutes within that 90 minutes.

Without wishing to be bound by theory it is believed that the application of a metal hydroxide, a metal phosphate, a metal carbonate or a mixture thereof as a dry powder followed by calcination may produce a particularly effective porous layer including at least a portion of the dry powder being retained on the wall of the porous substrate. In particular it is believed that decomposition of the metal hydroxide, metal phosphate, and or metal carbonate into metal oxides produces a cementitious effect both between the particles of the dry powder and between the dry powder and the porous substrate.

The calcined vehicular exhaust filter may have a filtration efficiency at 0.02 g/l soot loading of greater than 90%, preferably greater than 95%, preferably greater than 98%, preferably greater than 99%. The calcined vehicular exhaust filter may have a back pressure of 20-180 mbar at a flowrate of 600 m$^3$/hr.

The calcined vehicular exhaust filter may exhibit a substantially linear loading-back pressure response for soot loadings greater than 0.1 g/l, preferably for soot loadings greater than 0.05 g/l.

The method may further comprise coating the filter with a washcoat, preferably a catalyst washcoat.

A secondary gas flow, separate to the primary gas flow, may be used to transfer the dry powder from the reservoir to the spray device; and optionally the secondary gas flow is controllable independently of the primary gas flow.

The secondary gas flow may comprise a flow of compressed gas, preferably air.

The secondary gas flow may be applied as a single burst or a plurality of intermittent bursts.

A vacuum generator may be used to establish the primary gas flow through the porous structure of the filter. A level of the pressure reduction generated by the vacuum generator may be controllable independently of a speed or mass rate of the transfer of the dry powder from the reservoir to the spray device.

The primary gas flow may have a volumetric flow rate of 10 m$^3$/hr to 5,000 m$^3$/hr, preferably 400 m$^3$/hr to 2,000 m$^3$/hr, preferably 600 m$^3$/hr to 1000 m$^3$/hr.

A pressure sensor, preferably a single pressure sensor, may be used to monitor the back pressure. The pressure sensor, preferably the single pressure sensor, may be located in a filter holder or other housing fluidly connected to the outlet face of the filter. The same pressure sensor, preferably the same single pressure sensor, may be used to monitor the back pressure of the filter during at least steps c) and f).

In step e) the dry powder may be sprayed from one or more outlets of the spray device.

The one or more outlets of the spray device may comprise an aperture size of 1 to 10 mm, optionally 0.5 to 5.0 mm, optionally 1.0 to 2.5 mm, optionally 1.0 to 2.0 mm.

The dry powder may be sprayed from one or more fixed outlets of the spray device. Alternatively, the dry powder may be sprayed from one or more mobile outlets of the spray device, preferably from one or more oscillating outlets.

The method may further comprise in step e) channelling the dry powder from the spray device to the inlet face of the filter within a flow conduit. The flow conduit may provide an unimpeded flow path between the spray device and the inlet face of the filter. Alternatively, the flow conduit may comprise a flow conditioner interposed between the spray device and the inlet face of the filter, the flow conditioner acting to promote dispersion of the dry powder within the gas flow. The flow conditioner may comprise one or more of a static mixer, a mesh, a sieve, a baffle, and an orificed plate.

The inlet face of the filter may be located greater than 10 cm, optionally greater than 20 cm from the nozzle outlet of the spray nozzle. Particular benefit may be found when the inlet face of the filter is located greater than 75 cm, optionally greater than 100 cm from the nozzle outlet of the spray nozzle. Beneficially, such spacing may increase the percentage area of the inlet face of the filter receiving the dry powder leading to improved homogeneity of dry powder application to the filter. Additionally, or alternatively the outlet nozzle of the spray nozzle may be located at a distance from the inlet face of the filter that is up to 4 times a diameter of the inlet face of the filter.

The method may further comprise in step d) dosing the dry powder from the reservoir. The dosing may comprise dosing by one or more of by weight, by volume, by particle number, by time.

The method may comprise gravimetrically feeding a dosing device with the dry powder.

The dosing may use a loss in weight feeder.

In step a) the dry powder may be contained in one or more hoppers.

In step b) the filter may be located in the holder in a vertical orientation with the inlet face uppermost. In step d) the spray device may be located vertically above the inlet face; and preferably a spray direction of the spray device may be co-axial with a longitudinal axis of the filter; and preferably the spray direction and the longitudinal axis are coincident.

The porous substrate may be a wall-flow filter.

The present disclosure extends to a filter obtainable by any of the methods described above.

The filter may be a catalysed soot filter (CSF), a selective catalytic reduction filter (SCRF), a lean NOx trap filter (LNTF), or a gasoline particulate filter (GPF).

In this specification the term "filter" refers to a porous substrate that has a porous structure suitable for filtering particulate matter from exhaust gas. The porous substrate may be formed for example from sintered metal, ceramic or metal fibres etc. The filter may be of the wall-flow kind made from porous material, for example ceramic, fabricated in the form of a monolithic array of many small channels running along the length of the body. For example, the filter may be formed from cordierite, various forms of silicon carbide or aluminium titanate.

The filter may be a "bare" filter or alternatively may be one with an incorporated catalytic function ability such as oxidation, NOx-trapping, or selective catalytic reduction activity. The porous substrate may comprise a composition (known as a washcoat) that coats the porous structure of the filter. The washcoat may be a catalytic washcoat. The catalytic washcoat may comprise a catalyst, selected from the group consisting of a hydrocarbon trap, a three-way catalyst (TWC), a NOx absorber, an oxidation catalyst, a selective catalytic reduction (SCR) catalyst, a lean NOx catalyst and combinations of any two or more thereof. The catalyst, for example the TWC, NOx absorber, oxidation catalyst, hydrocarbon trap and the lean NOx catalyst, may contain one or more platinum group metals, particularly those selected from the group consisting of platinum, palladium and rhodium.

Consequently, the coated filter may, for example, be a catalysed soot filter (CSF), a selective catalytic reduction filter (SCRF), a lean NOx trap filter (LNTF), a gasoline particulate filter (GPF), an ammonia slip catalyst filter (ASCF) or a combination of two or more thereof (e.g. a filter comprising a selective catalytic reduction (SCR) catalyst and an ammonia slip catalyst (ASC).

The shape and dimensions of the filter, for example properties such as the channel wall thickness and its porosity etc. may be varied depending on the intended application for the filter. The filter may be configured for use with an internal combustion engine to filter the exhaust gas emitted by the internal combustion engine. The internal combustion engine may be a gasoline spark ignition engine. However, the filter finds particular application when configured for use with an internal combustion engine in the form of a diesel or gasoline engine.

In this specification the term "dry powder" refers to a particulate composition that is not suspended or dissolved in a liquid. It is not meant to necessarily imply a complete absence of all water molecules. The dry powder is preferably free flowing.

In this specification the term "tapped density" refers to the tapped density of the powder as measured according to Method 1 of Section 2.9.35 of European Pharmacopoeia 7.0 with 1250 taps.

In this specification the term "g/l" (grams per litre) refers to the mass of dry powder divided by the volume of the filter.

In this specification the terms "loading" and "mass loading" when referencing the quantity of dry powder, refer to the mass of powder added to a filter and may be measured by weighing the filter before and after application of the powder to the filter.

In this specification the term "d50 (by volume)" refers to a d50 (by volume) measurement as measured by a Malvern Mastersizer® 3000 with Aero s dispersion unit, available from Malvern Panalytical Ltd, Malvern, UK. Dispersion conditions: Air pressure=2 barg, feed rate=65%, hopper gap=1.2 mm. Refractive index and absorption parameters set in accordance with instructions provided in the Malvern Mastersizer® 3000 User Manual.

In this specification the term "vacuum generator" refers to an apparatus or combination of apparatus that function to produce a pressure reduction. Non-limiting examples of suitable apparatus include vacuum generators that operate on the venturi principle, vacuum pumps, for example rotary vane and liquid ring vacuum pumps, and regenerative blowers.

In this specification the term "pressure sensor" refers to an apparatus or combination of apparatus that function to measure an absolute and/or relative pressure. Non-limiting examples of suitable apparatus include pressure transducers which may be diaphragm pressure transducers. For example, a Wika® P30 pressure transmitter, available from WIKA Alexander Wiegand SE & Co. KG, Klingenberg, Germany may be used.

In this specification the term "controller" refers to a function that may comprise hardware and/or software. The controller may comprise a control unit or may be a computer program running on a dedicated or shared computing resource. The controller may comprise a single unit or may be composed of a plurality of sub-units that are operatively connected. The controller may be located on one processing resource or may be distributed across spatially separate processing resources. The controller may comprise a microcontroller, one or more processors (such as one or more microprocessors), memory, configurable logic, firmware, etc.

In this specification, ranges and amounts may be expressed as "about" a particular value or range. About also includes the exact amount. For example, "about 2 microns" means "about 2 microns" and also "2 microns." Generally, the term "about" includes an amount that would be expected to be within experimental error. The term "about" may include values that are within 5% less to 5% greater of the value provided. For example, "about 2 microns" means "between 1.9 microns and 2.1 microns".

In this specification the expression that a dry powder "consists of" means a dry powder that essentially consists of only the specified constituent(s), other than for unavoidable impurities as normally encountered as will be recognised by the person skilled in the art.

BRIEF DESCRIPTION OF THE DRAWINGS

Aspects and embodiments of the present disclosure will now be described, by way of example only, with reference to the accompanying drawings, in which:

FIG. 1 is a schematic diagram of an apparatus for treating a filter for filtering particulate matter from exhaust gas according to the present disclosure;

FIG. 2 is a flow diagram illustrating a method for manufacturing a filter according to the present disclosure incorporating a method for treating a filter using the apparatus of FIG. 1;

FIG. 3 is a flow diagram illustrating a method for treating a filter for filtering particulate matter from exhaust gas using the apparatus of FIG. 1;

FIG. 4 is a graph showing back pressure against time for two filters treated with different mass loadings of dry powder;

FIGS. 5 and 6 are graphs showing back pressure against time for two filters subject to two different regimes for spraying the dry powder;

FIG. 7 shows a calibration map comparing cold flow back pressure (CFBP) on a coating apparatus and a testing apparatus;

FIGS. 8 and 9 show further calibration maps comparing CFBP on a coating apparatus and a testing apparatus;

DETAILED DESCRIPTION

The skilled reader will recognise that one or more features of one aspect or embodiment of the present disclosure may be combined with one or more features of any other aspect or embodiment of the present disclosure unless the immediate context teaches otherwise.

Figure 1:
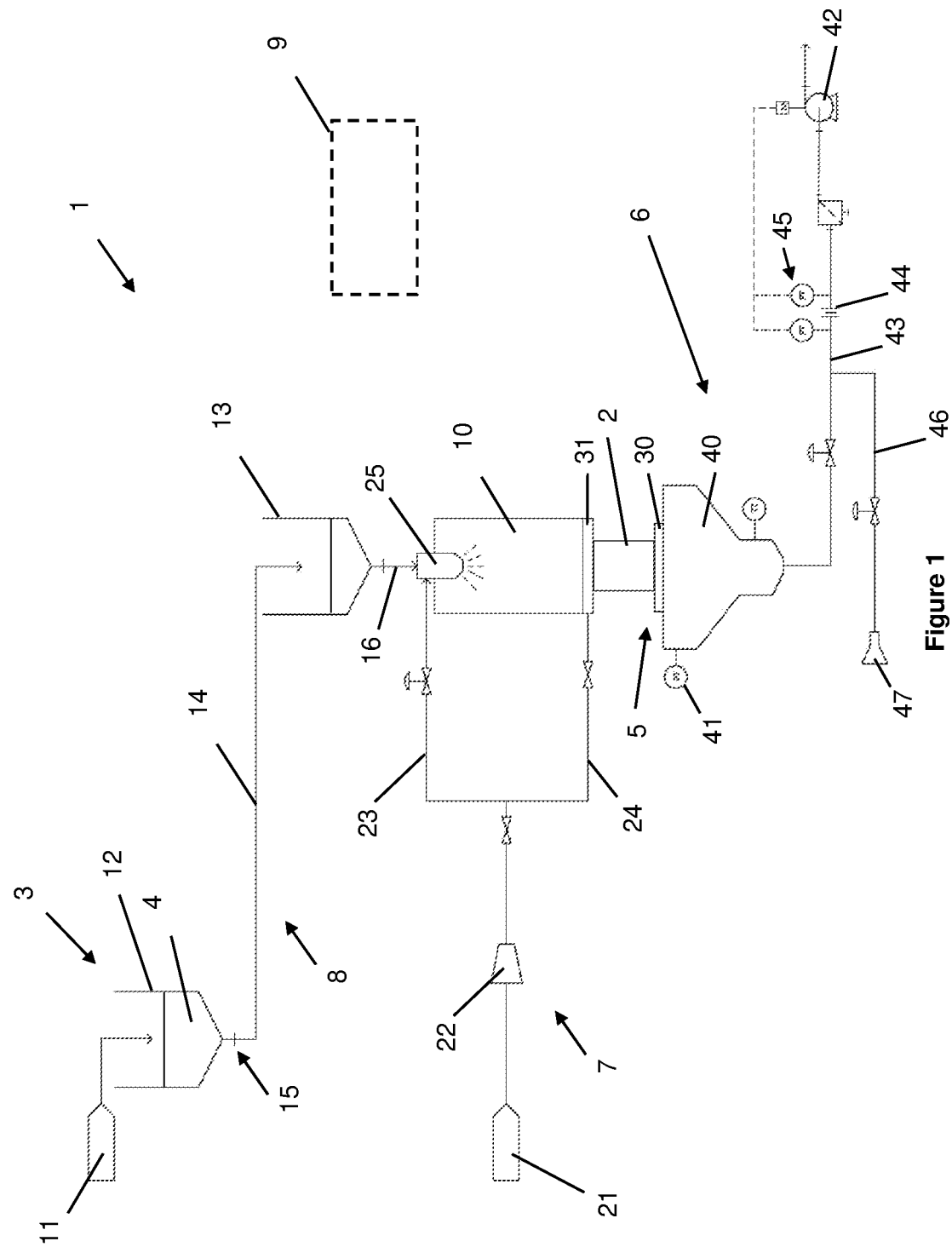
Figure 2:
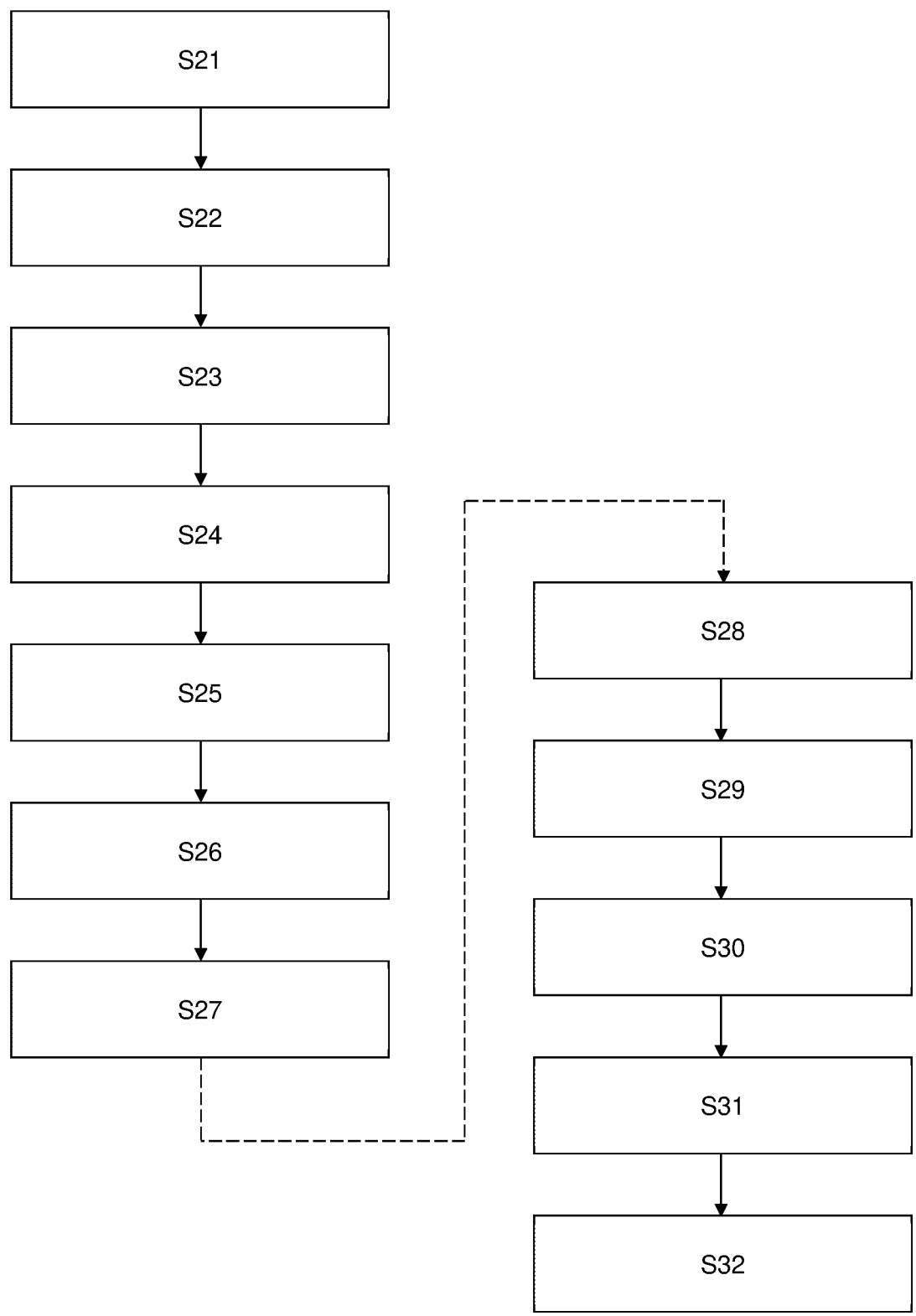
Figure 3:
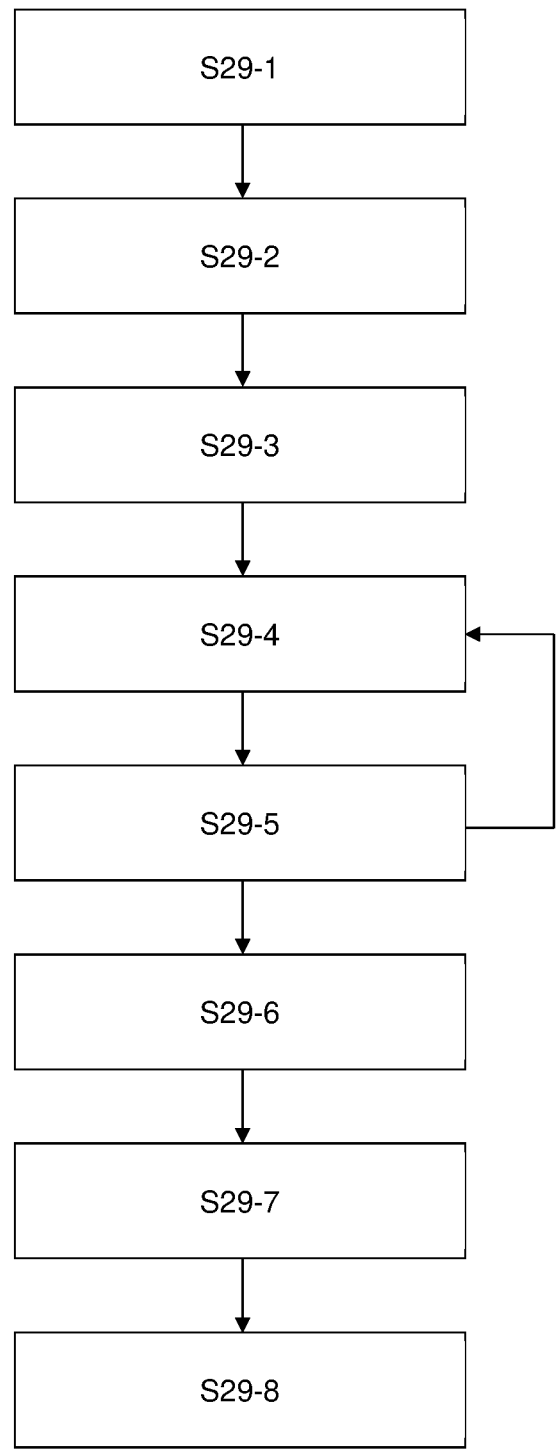

An example of an apparatus for performing the methods of the present disclosure will now be described with reference to FIG. 1 which shows a schematic diagram of an apparatus 1 for treating a filter 2 for filtering particulate matter from exhaust gas. The filter 2 is of a type that comprises a porous substrate having an inlet face and an outlet face, the inlet face and the outlet face being separated by a porous structure.

The apparatus 1 comprises a reservoir 3 for containing a dry powder 4. A filter holder 5 is provided for holding the filter 2. A vacuum generator 6 is provided for establishing in use a primary gas flow through the porous structure of the filter 2 by applying a pressure reduction to the outlet face of the filter 2. A transport device 8 is provided for transporting the dry powder 4 from the reservoir 3 to a spray device 7. The spray device 7 is provided for receiving the dry powder 4 from the transport device 8 and spraying the dry powder 4 towards the inlet face of the filter 2. A controller 9 is provided which is configured to control operation of the apparatus 1.

The reservoir 3 may receive dry powder 4 from a dry powder inlet 11. The dry powder inlet 11 may be an output of an upstream bulk supply of the dry powder. For example, the dry powder inlet 11 may be a conduit connected upstream to a further reservoir of the dry powder 4. The dry powder inlet 11 may represent a manual, semi-automatic or automatic re-filling of the reservoir 3 through a lid or opening of the reservoir 3.

The reservoir 3 may comprise one or more hoppers. The reservoir 3 may comprise one hopper. In the illustrated example of FIG. 1, the reservoir 3 comprises a first hopper 12 and a second hopper 13. The second hopper 13 may be downstream of the first hopper 12 to receive dry powder 4 output from the first hopper 12. The one or more hoppers may be provided in separate housings. Alternatively, the one or more hoppers may be provided in a single housing. The one or more hoppers may comprise one or more chambers of a single container.

The reservoir 3 may comprise a dosing device 15. The dosing device 15 may dose the dry powder 4 by one or more of by weight, by volume, by particle number, by time. The dosing device 15 may be located at or near an outlet of the reservoir 3. The dosing device 15 may be located at or near an outlet of the one or more hoppers of the reservoir 3. The dosing device may be located at or near the outlet of the first hopper 12.

The dosing device 15 may be gravimetrically fed with the dry powder 4 from the reservoir 3.

The dosing device 15 may be a loss in weight feeder. The dosing device 15 may be a volumetric feeder comprising an auger or screwthread arrangement. Non-limiting examples of suitable dosing devices include the Coperion® K-iron Type K2-ML-T35 Gravimetric twin screw feeder available from Coperion GmbH, Stuttgart, Germany, the All-Fill® Series 51 Micro-Fill and the All-Fill® Series 10 gravimetric or volumetric auger fillers available from All-Fill International Ltd, Sandy, UK.

The transport device 8 transports the dry powder 4 from the reservoir 3 to the spray device 7. The transport device 8 may gravimetrically or volumetrically feed the dry powder 4 at least part way towards the spray device 7.

The transport device 8 may comprise one or more components. The transport device 8 may comprise one or more conduits, for example, passages, pipes, hoses, etc.

Where the reservoir 3 comprises more than one hopper the transport device 8 may transport the dry powder 4 between the hoppers. The transport device 8 may gravimetrically or volumetrically feed the dry powder 4 between the hoppers. The transport device 8 may comprise a first conduit 14 extending between the first hopper 12 and the second hopper 13. The first conduit 14 may extend from a first housing to a second housing. Alternatively, the first conduit 14 may extend from a first chamber to a second chamber of a single container. The dry powder 4 may be gravimetrically fed along the first conduit 14.

The transport device 8 may comprise a second conduit 16 extending from the second hopper 13 to the spray device 7.

The spray device 7 is provided for receiving the dry powder 4 from the transport device 8 and spraying the dry powder 4 towards the inlet face of the filter 2. The spray device 7 may comprise a secondary gas flow generator for generating a secondary gas flow that may be used to spray the dry powder 4 towards the inlet face of the filter 2.

The spray device 7 may further comprise one or more outlets for discharging the dry powder 4 towards the inlet face of the filter 2. The one or more outlets of the spray device may comprise an aperture size of 0.5 to 10 mm. The aperture may be circular, part-circular or slot-shaped. The one or more outlets may be one or more fixed outlets. Alternatively, the one or more outlets may be one or more mobile outlets, for example one or more oscillating outlets.

The one or more outlets may be provided in one or more nozzles. Each of the one or more nozzles may comprise one or more spray outlets. In the illustrated example of FIG. 1 a single nozzle 25 is provided which comprises a plurality of spray outlets.

The secondary gas flow generator may comprise a compressed gas generator. In the illustrated example of FIG. 1 the secondary gas flow generator comprises a compressed air generator which may comprise a compressor 22. The compressor 22 may receive air from an air inlet 21 and supply compressed air to the one or more outlets of the spray device 7 via a feed line 23. A return line 24 may be provided. Valves and controls necessary for operation may be provided as will be known to the skilled person.

An interconnection between the transport device 8 and the spray device 7 may be provided at which interconnection the dry powder 4 is transferred into the spray device 7 from the transport device 8. The interconnection may be provided at or near the one or more outlets of the spray device 7. In one example, the interconnection may be provided in the nozzle 25. Alternatively, the interconnection may be provided at or near the reservoir 3, for example at or near the second hopper 13 of the reservoir 3. In one example, the interconnection is a fluid connection between the feed line 23 and the second conduit 16. For example, the secondary gas flow of the spray device 7 may be fluidly connected with the second conduit 16 at or near an outlet of the second hopper 13 to fluidize the dry powder 4 to assist transport of the dry powder 4 along at least a portion of the second conduit 16. In another example, the dry powder 4 may be fed by gravity along the second conduit 16. The flow of the dry powder 4 down the second conduit 16 may be assisted by a suction force that draws the dry powder 4 towards an outlet of the second conduit 16. For example the spray nozzle 25 may produce a suction force to assist drawing of the dry powder 4 along the second conduit 16 and through the spray nozzle 25. For example the spray nozzle 25 may utilise the secondary gas flow from the feed line 23 to produce a suction force in a powder flow conduit of the spray nozzle 25 by means of a venturi device or similar apparatus.

In one example the spray device 7 comprises a compressed air gun. A non-limiting example of a suitable compressed air gun is the STAR Professional gravity feed spray gun 1.4 mm, part no. STA2591100C.

The filter holder 5 may function to maintain the filter 2 in a stationary position during treatment. The filter holder 5 may grip an upper and/or a lower end of the filter 2. The filter holder 5 may comprise an inflatable upper seal bladder 31 (also called an upper inflatable collar) and/or an inflatable lower seal bladder 30 (also called a lower inflatable collar) that support respective upper and lower ends of the filter 2. The inflatable upper seal bladder 31 and the inflatable lower seal bladder 30 may contact and/or engage with an exterior surface of the filter 2. Each may form a liquid or air-tight seal around the filter 2. The inflatable upper seal bladder 31 and the inflatable lower seal bladder 30 may be supported by one or more housings (e.g. supported by an internal wall of the one or more housings).

The apparatus 1 may be configured such that the filter 2 is located in the filter holder 5 in a vertical orientation with the inlet face of the filter uppermost. At least a portion of the spray device 7 may be located vertically above the inlet face. A spray direction of the spray device 7 may be co-axial with a longitudinal axis of the filter 2. The spray direction and the longitudinal axis of the filter 2 may be coincident.

The apparatus 1 may further comprise a flow conduit 10 located between the spray device 7 and the inlet face of the filter 2. The flow conduit 10 may function to constrain and channel the primary gas flow towards the inlet face of the filter 2. The flow conduit 10 may function to align the primary gas flow such that a flow direction of the primary gas flow when it contacts the inlet face of the filter 2 is normal to the inlet face.

The flow conduit 10 may be empty so as to provide an unimpeded flow path between the spray device 7 and the inlet face of the filter 2. Alternatively, the flow conduit 10 may comprise a flow conditioner interposed between the spray device 7 and the inlet face of the filter 2, the flow conditioner acting to promote dispersion of the dry powder 4. For example, the flow conditioner may comprise one or more of a static mixer, a mesh, a sieve, a baffle, and an orificed plate.

The flow conduit 10 may comprise a tube. The flow conduit 10 may comprise a cross-sectional shape that matches the cross-sectional shape of the inlet face of the filter 2. The flow conduit 10 may comprise a size that matches the size of the inlet face of the filter 2.

The spray device 7 may extend into the flow conduit 10. The one or more outlets of the spray device 7 may be located within the flow conduit 10. For example, the nozzle 25 may be located within an upper region of the flow conduit 10. The nozzle 25 may be located coincident with a longitudinal axis of the filter 2.

The inlet face of the filter 2 may be located greater than 10 cm, optionally greater than 20 cm from the spray device, for example from the nozzle 25 of the spray device 7. Particular benefit may be found when the inlet face of the filter 2 is located greater than 75 cm, optionally greater than 100 cm from the nozzle outlet of the spray nozzle 25. Additionally, or alternatively the spray device, for example from the nozzle 25 of the spray device 7, may be located at a distance from the inlet face of the filter 2 that is up to 4 times a diameter of the inlet face of the filter 2.

The vacuum generator 6 is provided for establishing in use the primary gas flow through the porous structure of the filter 2 by applying a pressure reduction to the outlet face of the filter 2. The vacuum generator 6 may comprise a vacuum cone 40 that may define a funnel that engages the outlet face of the filter 2. The inflatable lower seal bladder 30 may form a seal between the outlet face of the filter 2 and the vacuum cone 40. The vacuum generator 6 may comprise a vacuum pump 42 connected to the flow cone by a conduit 43. The vacuum pump 42 may be controlled to control the volumetric flow rate of the primary gas flow.

The vacuum generator 6 may be provided with a volumetric flow rate sensor. The volumetric flow rate sensor may be an orifice plate 44 in combination with pressure sensors 45 located along the conduit 43. The vacuum generator 6 may comprise a bypass conduit 46 extending to an intake 47.

The apparatus 1 may further comprises a pressure sensor 41 for monitoring a back pressure of the filter 2. A single pressure sensor 41 may be used. The single pressure sensor 41 may be located in the vacuum generator 6, preferably in a filter holder or other housing, for example the vacuum cone 40, of the vacuum generator.

The controller 9 controls operation of at least the vacuum generator 6 and the spray device 7. In FIG. 1 operative connections between the controller 9 and a remainder of the apparatus 1 are omitted for clarity. However, the skilled person would be aware that necessary connections of any suitable means may be provided. Such connections may be wired or wireless.

The controller 9 may be configured to control the transfer of the dry powder 4 from the reservoir 3 to the spray device 7 by the transport device 8 independently of controlling the primary gas flow produced by the vacuum generator 6. For example, the controller 9 may control operation of the dosing device 15.

The controller 9 may be configured to control spraying of the dry powder 4 towards the inlet face of the filter 2 independently of controlling the primary gas flow. Use of the term 'independently' in the present specification refers to the ability of the controller 9 to control each of the variables of the spraying of the dry powder 4 and the primary gas flow individually and irrespective of the status of the other variable. For example, the controller 9 may establish the primary gas flow without simultaneously spraying the dry powder 4. For example, the controller 9 may increase or decrease the rate of spraying of the dry powder 4 without altering the volumetric flow rate of the primary gas flow. For example, the controller 9 may increase or decrease the volumetric flow rate of the primary gas flow without altering the rate of spraying of the dry powder 4. For example, the controller 9 may control operation of the spray device 7 independently of controlling operation of the vacuum pump 42.

The controller 9 may be configured to operate the vacuum generator 6 to establish the primary gas flow before the dry powder 4 is transferred to the spray device 7 and sprayed towards the inlet face of the filter 2.

The controller 9 may be configured to control the secondary gas flow generator, for example the compressor 22, independently of the vacuum generator 6. The controller 9 may be configured to operate the vacuum generator 6 to maintain the primary gas flow as a continuous gas flow through the porous structure and to operate the secondary gas flow generator, for example the compressor 22, for only a portion of a period of the primary gas flow.

The controller 9 may be configured to control the vacuum generator 6 to control a level of the pressure reduction applied to the outlet face of the filter 2 independently of controlling the transport device 8 and/or the spray device 7 to control a speed or mass rate of the dry powder 4 sprayed towards the inlet face of the filter 2.

The controller 9 may be configured to stop the spraying of the dry powder 4 towards the inlet face of the filter 2 when a required value of the back pressure of the filter 2 is reached, for example as detected by the pressure sensor 41.

The apparatus 1 may be used to treat a filter with a dry powder 4 comprising or consisting of one or more refractory powders, optionally comprising one or more fumed refractory powders, and or one or more aerogels. Additionally or alternatively, the apparatus 1 may be used to treat a filter with a dry powder 4 comprising or consisting of a metal compound for forming by thermal decomposition a metal oxide. In examples the metal compound may comprise or consist of a metal hydroxide, a metal phosphate, a metal carbonate, a metal sulphate, a metal perchlorate, a metal iodide, a metal oxalate, a metal acetate, a metal chlorate or a mixture thereof.

An example of a method of treating a filter in accordance with the present disclosure will now be described with reference to FIG. 2 which shows a flow diagram illustrating a method for manufacturing a filter 2 incorporating use of the apparatus 1. By way of example only the method will be described with reference to a filter 2 provided with a catalytic coating.

In step S21 a catalytic slurry is prepared by methods as known in the art.

In step S22 a washcoat is prepared from the catalytic slurry by methods as known in the art. The washcoat may be, for example, a hydrocarbon trap, a three-way catalyst (TWC), a NOx absorber, an oxidation catalyst, a selective catalytic reduction (SCR) catalyst, a lean NOx catalyst and combinations of any two or more thereof.

In step S23 the washcoat is dosed and applied to a bare filter 2 by methods as known in the art. For example the washcoat may be applied to a first face of the filter 2 (e.g. an upper face) and an opposite, second face (e.g. a lower face) of the filter 2 may be subjected to at least a partial vacuum to achieve movement of the washcoat through the porous structure of the filter 2. The filter 2 may be coated in a single dose wherein washcoat may be applied to the filter 2 in a single step with the filter 2 remaining in a single orientation. Alternatively, the filter 2 may be coated in two doses. For example, in a first dose the filter 2 may be in a first orientation with a first face uppermost and a second face lowermost. A coating may be applied to the first face and coats a portion of the length of the filter 2. The filter 2 may then be inverted so that the second face is uppermost. A coating may then be applied to the second face in order to coat the portion of the filter 2 that was uncoated by the first dose. Beneficially, a two-dose process may allow different coatings to be applied to each end of the filter 2.

In step S24 the filter 2 may be dried.

In step S25 the filter 2 may be calcined by methods as known in the art.

In optional step S26 the back pressure of the filter 2 before treatment may be measured.

In optional step S27 the filter 2 may be placed in stock to await treatment. Thereafter, in step S28 the filter 2 may be removed from stock and passed for treatment. Alternatively, the filter 2 may be treated immediately, i.e. by proceeding directly to step S29.

In step S29 the filter 2 is treated according to the present disclosure as will be described in further detail below with reference to FIG. 3.

In step S30, after treatment, the filter 2 may be calcined. Calcining the filter may be carried out at a temperature selected to produce thermal decomposition of the dry powder 4.

The calcination temperature may be selected to be at least 150° C., optionally at least 250° C., optionally at least 500° C.

In some embodiments it is preferred that the calcination temperature is no greater than 550° C. However, in other embodiments, the calcination temperature may be selected to be greater than 550° C. The calcination temperature may be selected to be up to 900° C., optionally up to 1150° C.

In one example the calcination temperature may be selected to be between 300° C. and 500° C. In another example the calcination temperature may be selected to be about 520° C. In another example the calcination temperature may be selected to be about 580° C. In another example the calcination temperature may be selected to be about 900° C.

The calcination may be carried out for a period of 30 to 90 minutes, optionally 30 to 60 minutes. In one example the period is about 35 minutes. In another example the period is about 60 minutes. Within the calcination, the dwell time of 1 to 15 minutes, preferably 5 to 10 minutes In optional step S31 the back pressure of the filter 2 after treatment may be measured.

In step S32 the finished filter 2 may be readied for delivery to a customer.

FIG. 3 shows a flow diagram illustrating the treatment of step S29 of FIG. 2.

In step S29-1 the filter may be loaded into the filter holder 5. The filter 2 may be held in a stationary position during treatment. The filter 2 may be gripped by the filter holder 5 at an upper and/or a lower end of the filter 2. The inflatable upper seal bladder 31 and the inflatable lower seal bladder 30 may be inflated to contact and/or engage with the exterior surface of the filter 2. The filter 2 may be held in a vertical orientation with the inlet face of the filter uppermost. Operation of the filter holder 5, for example inflation of the inflatable upper seal bladder 31 and the inflatable lower seal bladder 30 may be controlled by the controller 9.

In step S29-2 the vacuum generator 6 may activated by the controller 9 to establish the primary gas flow through the filter 2. Preferably, the primary gas flow is established before the dry powder 4 is transferred to the spray device 7 and sprayed towards the inlet face of the filter 2. A level of the pressure reduction generated by the vacuum generator 6 may be controlled by the controller 9 independently of a speed or mass rate of the transfer of the dry powder 4 from the reservoir 3 to the spray device 7. The primary gas flow may have a volumetric flow rate of 10 $m^3$/hr to 5,000 $m^3$/hr, preferably 400 $m^3$/hr to 2,000 $m^3$/hr, preferably 600 $m^3$/hr to 1000 $m^3$/hr.

In step S29-3 the back pressure of the filter 2 may be measured while the primary gas flow is established but before the secondary gas flow is established. The back pressure may be measured in this step until the back pressure has stabilised.

The back pressure of the filter 2 may be considered stable when the first derivative of the primary gas flow rate is $\leq \pm X$ m$^3$ hr$^{-1}$·s$^{-1}$, wherein X=0 to 0.30, optionally X=0.10 to 0.20, X=0.15. Additionally or alternatively, the back pressure of the filter 2 may be considered stable when the first derivative of the back pressure of the filter is $\leq \pm Y$ mbar·s$^{-1}$, wherein Y=0.5 to 3.0, optionally Y=1.0 to 2.0, optionally Y=1.5. Additionally or alternatively, the back pressure of the filter 2 may be considered stable when the primary gas flow rate is within Z % of a predetermined flow rate, wherein Z=1.5, optionally Z=1.0, optionally Z=0.5.

The back pressure may be measured by use of the pressure sensor 41. The back-pressure measurement in step S29-3 may be in addition to, or in place of the back-pressure measurement of step S26. Alternatively, the back-pressure measurement of step S26 may be used in place of the back-pressure measurement of step S29-3. The back-pressure measurement of step S26 and/or the back-pressure measurement of step S29-3 may be used by the controller 9 as a measure of a first back pressure of the filter 2 prior to treatment.

In step S29-4 the dry powder 4 is sprayed at the inlet face of the filter 2 by the spray device 7. During spraying of the dry powder 4 the dry powder 4 may be supplied to the spray device 7 by the transport device 8.

The spraying of the dry powder 4 towards the inlet face of the filter 2 is preferably controllable by the controller 9 independently of establishing and controlling the primary gas flow.

During step S29-4 the secondary gas flow, for example supplied by the compressor 22, which is separate to the primary gas flow, may be used to transfer the dry powder 4 from the reservoir 3 to the spray device 7. Preferably the secondary gas flow is controllable by the controller 9 independently of the primary gas flow. For example, the controller 9 may control operation of the compressor 22 and/or the valves and/or the nozzle 25 of the spray device 7 independently of controlling operation of the vacuum pump 42. The dry powder 4 may be sprayed towards the inlet face of the filter 2 by use of the secondary gas flow. The secondary gas flow may comprise a flow of compressed gas, preferably air.

During step S29-4 the primary gas flow is preferably maintained as a continuous flow. During step S29-4 the secondary gas flow may be applied as a single burst or a plurality of intermittent bursts.

In step S29-5 the back pressure of the filter 2 is monitored while the dry powder 4 is sprayed. The back pressure may be monitored by use of the pressure sensor 41. The controller 9 may be configured to stop the spraying of the dry powder 4 towards the inlet face of the filter 2 when the back pressure of the filter 2 reaches a required value. If the required value for the back pressure has not yet been reached, then the controller 9 be configured to return to step S29-4 and continue spraying of the dry powder 4. This feedback may be continuous and need not involve any pause in the spraying of the dry powder 4, i.e. the controller 9 may continuously monitor the back pressure of the filter 2 as spraying of the dry powder 4 is on-going. The back pressure of the filter 2 may be monitored continuously during at least step S29-5. The back pressure may be continuously monitored by measuring the back pressure at a sample rate of $\geq 1$ samples·s$^{-1}$, optionally $\geq 5$ samples·s$^{-1}$, optionally $\geq 10$ samples·s$^{-1}$. The pressure sensor 41 may incorporate a degree of damping to reduce or eliminate the effects of transient readings that may be noise-related.

In step S29-6 the spraying of the dry powder 4 is stopped. For example, this may be achieved by the controller 9 stopping transfer of the dry powder by the transport device 8 and/or by stopping the secondary gas flow of the spray device 7. In step S29-6 the primary gas flow may be maintained through the porous structure of the filter 2 for a time period after the stopping of the spraying of the dry powder 4. The controller 9 may be configured to operate the vacuum generator 6 for a time period after the stopping of the spraying of the dry powder 4. For example, the primary gas flow may be maintained until the back pressure measured in this step has stabilised.

As above, the back pressure of the filter 2 may be considered stable when the first derivative of the primary gas flow rate is $\leq \pm X$ m$^3$ hr$^{-1}$·s$^{-1}$, wherein X=0 to 0.30, optionally X=0.10 to 0.20, X=0.15. Additionally or alternatively, the back pressure of the filter 2 may be considered stable when the first derivative of the back pressure of the filter is $\leq \pm Y$ mbar·s$^{-1}$, wherein Y=0.5 to 3.0, optionally Y=1.0 to 2.0, optionally Y=1.5. Additionally or alternatively, the back pressure of the filter 2 may be considered stable when the primary gas flow rate is within Z % of a predetermined flow rate, wherein Z=1.5, optionally Z=1.0, optionally Z=0.5.

Optionally, in step S29-6 the quantity of dry powder 4 delivered towards the inlet face of the filter 2 may be measured. The controller 9 be configured to determine the quantity of the dry powder 4 delivered from signal outputs from the dosing device 15, for example from an output from the loss in weight feeder.

The method may be configured to deliver a maximum loading of the filter of 10 to 40 g/l, optionally 15 to 30 g/l, optionally about 20 g/l of the dry powder 4; or to deliver a maximum loading of the filter of <10 g/l, optionally <5 g/l, optionally <2 g/l of the dry powder 4.

In step S29-7 the primary gas flow through the filter 2 is stopped. This may be achieved by the controller 9 stopping the vacuum generator 6, i.e. stopping the vacuum pump 42.

Alternatively, this may be achieved by the controller operating valves of the vacuum generator 6 to divert the suction through the bypass conduit 46 to draw air in through intake 47. This may avoid the need to stop the vacuum pump 42 between treatments of successive filters 2 which may lead to a faster cycle time.

In step S29-8 the filter 2 is unloaded from the filter holder 5 by, for example, deflating the inflatable upper seal bladder 31 and the inflatable lower seal bladder 30. The filter 2 may then be removed and passed to step S30 as described above.

Returning to Step 29-5, the event triggering the stopping of the spraying of the dry powder 4 will be discussed in more detail.

Figure 4:
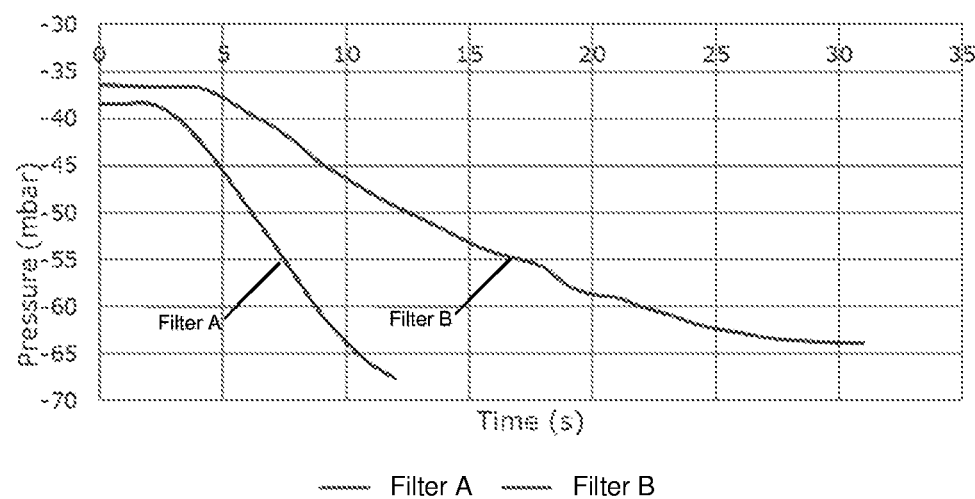
Figure 5:
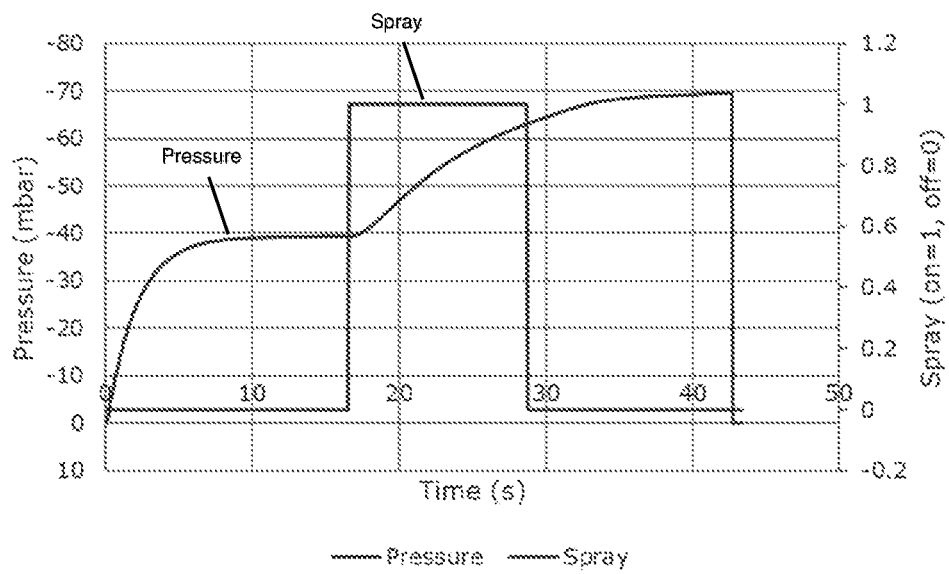
Figure 6:
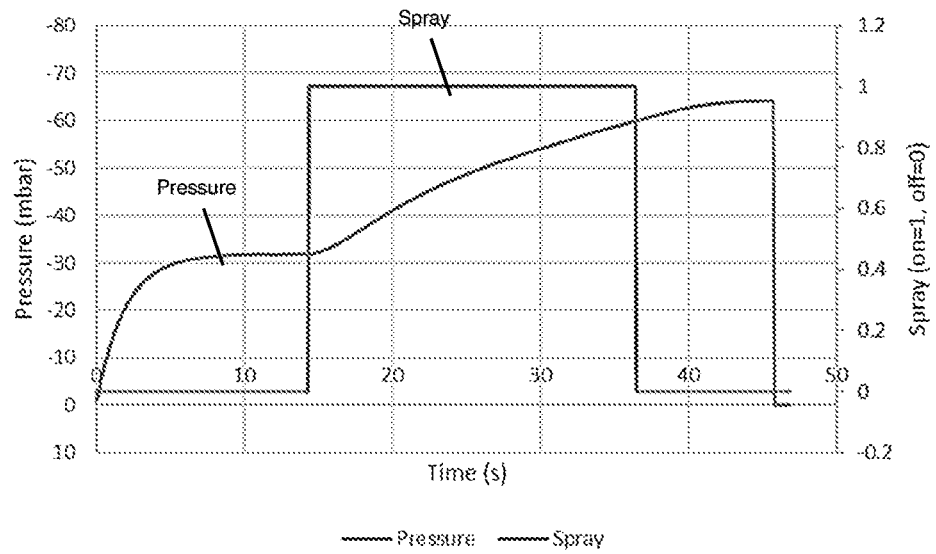
Figure 7:
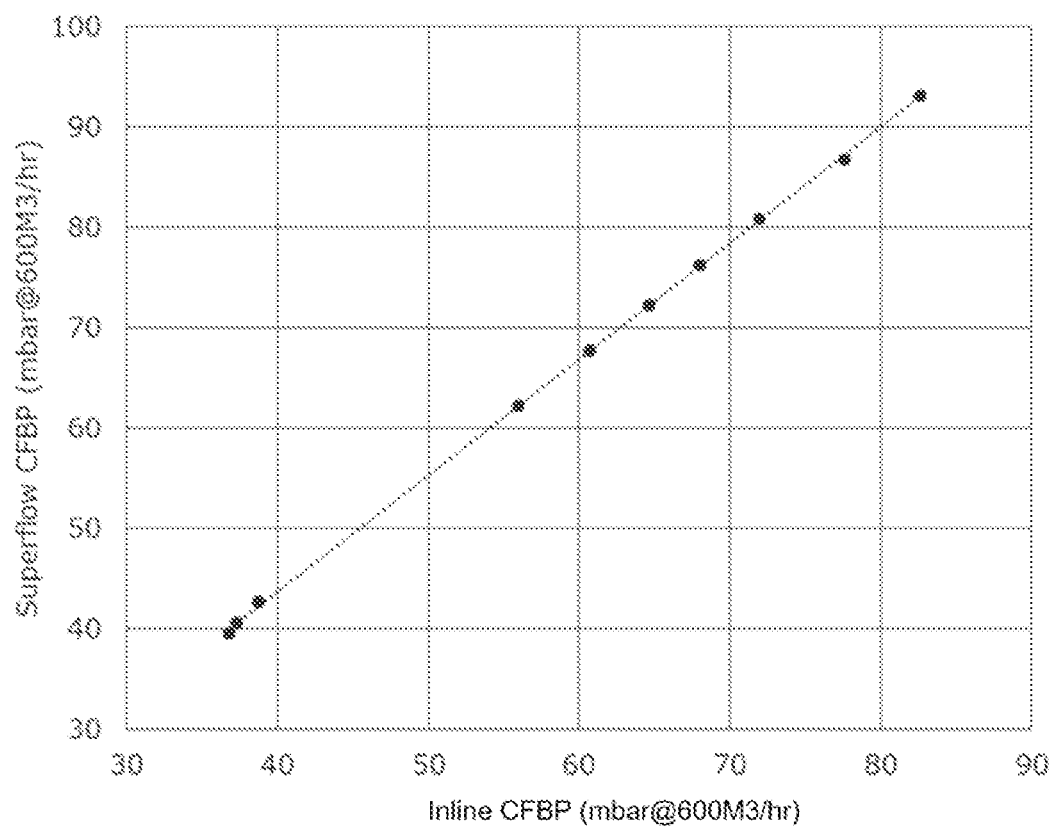
Figure 8:
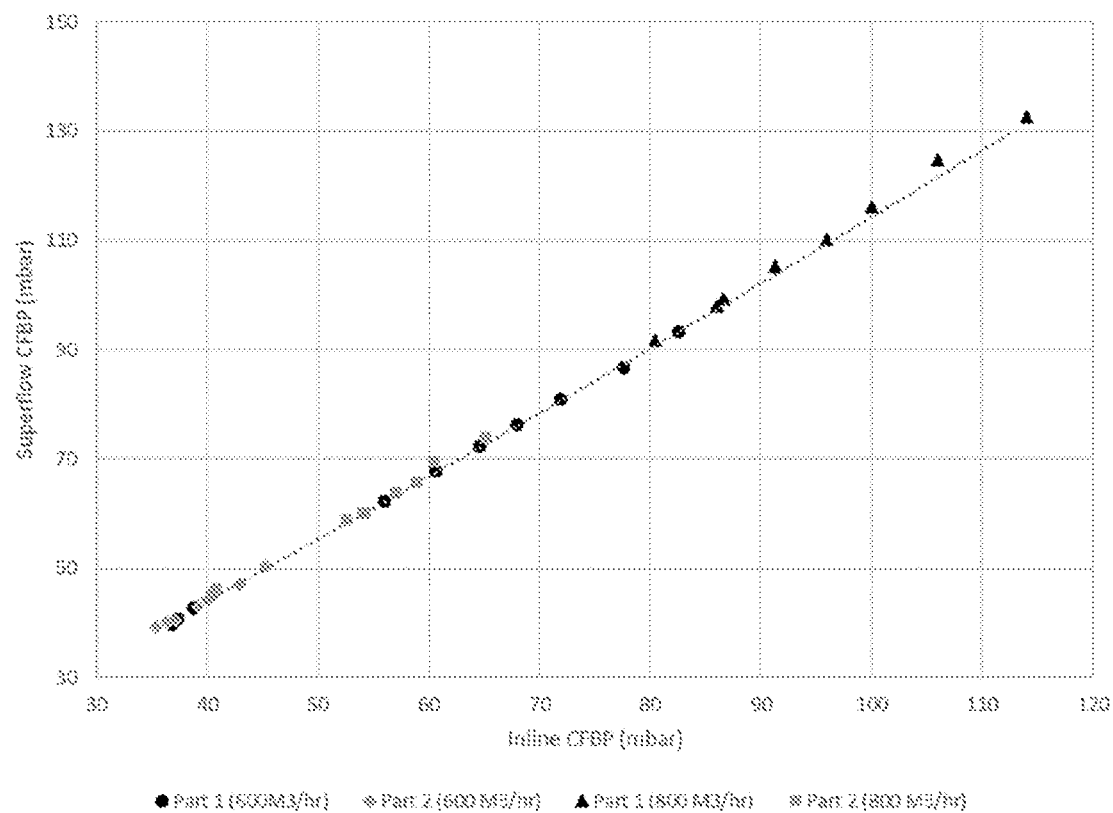
Figure 9:
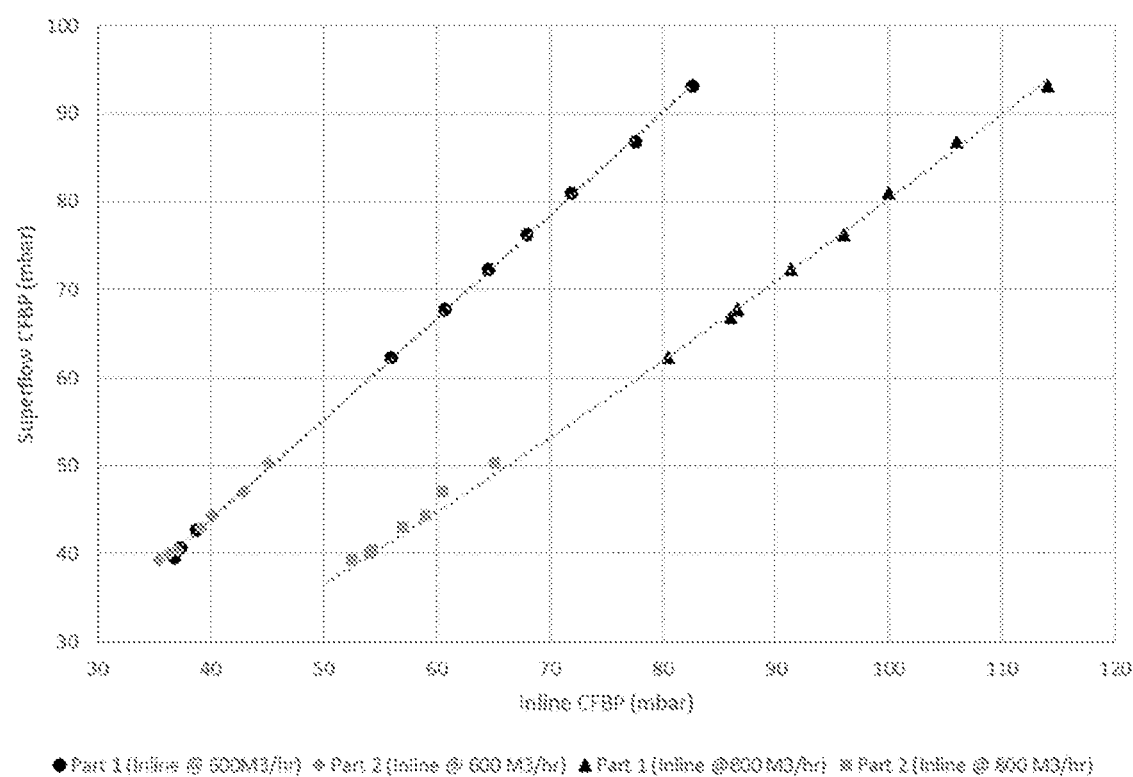

When treating filters 2, the present applicant has found that the final back pressure of the filter cannot be controlled simply by controlling the mass loading of dry powder 4 applied to the filter 2. For example, FIG. 4 illustrates treatment of two filters, A and B, that have similar initial back pressures prior to coating (36 and 38 mbar). After treatment with the dry powder 4, both filters have similar back pressures of 64 and 67 mbar. However, the mass loading of the filters was very different. Filter A was treated with 2.8 g of dry powder that was sprayed over a period of 7 s. Filter B was treated with 8 g of dry powder that was sprayed over a period of 20 s. The difference in the required mass loading of dry powder to achieve a similar increase in back pressure is believe to be due to differences in the substrate properties of the filter including, but not limited to pore size and location of any applied washcoat.

Consequently, it can be beneficial to monitor the back pressure of the filter 2 during spraying of the dry powder 4 in step S29-5 and, as noted above, for the controller 9 to stop the spraying of the dry powder 4 towards the inlet face of the filter 2 when the back pressure of the filter 2 reaches a required value.

Figure 10:
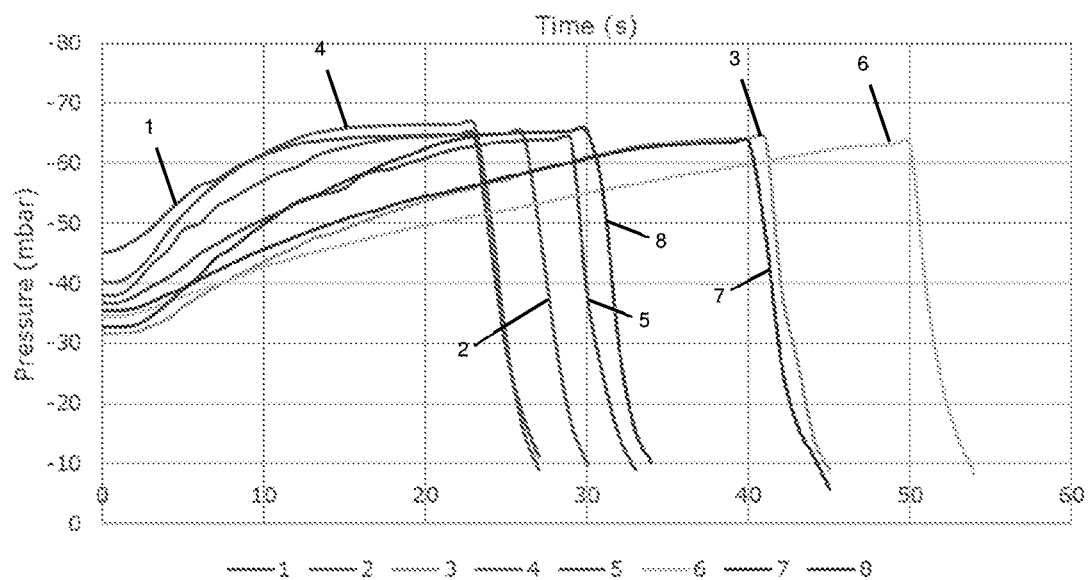
FIG. 10 shows a graph showing back pressure against time for eights filters.

In some examples, the required value of the back pressure of the filter 2 when the spraying of the dry powder 4 is stopped may be a predetermined target back pressure, $p_{target}$, of the filter 2. The pre-determined back pressure, $p_{target}$, may be the desired final back pressure of the filter 2 as measured by the apparatus 1, i.e. the coating apparatus. The pre-determined back pressure, $p_{target}$, may be an absolute back pressure. The absolute back pressure may be, for example, between 20-180 mbar at a flowrate of 600 $m^3$/hr.

The present applicant has discovered that if the required value is chosen as the pre-determined back pressure, $p_{target}$, then the final back pressure of the filter 2 may overshoot the target. For example, as illustrated in the example of FIG. 5 a filter was treated with a target for the pre-determined back pressure, $p_{target}$, of 63 mbar. The dry powder spraying commenced at ~17 seconds when the back pressure of the filter had stabilised and was stopped at ~29 seconds when the back pressure of the filter, $p_{BP}$, reached the target of 63 mbar. However, the back pressure of the filter continued to increase, i.e. overshot, and eventually stabilised at around 70 mbar.

Consequently, the present applicant has discovered that an improved method of treatment may be achieved by, in Step S29-5, monitoring the back pressure of the filter 2 and stopping the spraying of the dry powder 4 towards the inlet face of the filter 2 when:

$$p_{BP} \geq p_{target} - p_{offset}$$

where, $p_{BP}$ is the back pressure of the filter 2;

$p_{target}$ is a pre-determined target back pressure for the filter 2; and $p_{offset}$ is a pre-chosen offset pressure.

For example, FIG. 6 shows a modified treatment process where, as above, the target for the pre-determined back pressure, $p_{target}$, was 63 mbar. An offset pressure, $p_{offset}$, of 3 mbar was selected. The dry powder spraying commenced at ~14 seconds when the back pressure of the filter had stabilised and was stopped at ~37 seconds when the back pressure of the filter, pep, reached the 60 mbar, i.e. 63 mbar-3 mbar. The back pressure of the filter continued to increase after the cessation of spraying of the dry powder and eventually stabilised at around 63 mbar, i.e. at the desired final back pressure.

The pre-determined target back pressure for the filter, $p_{target}$, may be an absolute back pressure of the filter 2. For example, the pre-determined target back pressure for the filter 2, $p_{target}$, may be a target back pressure of 20-180 mbar. Alternatively, the pre-determined target back pressure for the filter 2, $p_{target}$, may be a relative back pressure of the filter 2. For example, the pre-determined target back pressure for the filter 2, $p_{target}$, may be a back pressure that is relative to an initial back pressure of the filter 2 before spraying of the dry powder 4. For example, the pre-determined target back pressure for the filter 2, $p_{target}$, may be 105% to 200%, optionally 125% to 150% of the initial back pressure of the filter 2.

The spraying of the dry powder 4 towards the inlet face of the filter 2 may be stopped when $p_{BP} \geq p_{target} - p_{offset}$ is true for a minimum time period, $t_{min}$. The minimum time period may be $t_{min} \geq 0.1$ s, optionally $\geq 0.5$ s, optionally $\geq 1.0$ s.

The $p_{offset}$ may be, for example 1-10 mbar, optionally 2-5 mbar, optionally 3-5 mbar. For example, such a $p_{offset}$ may be used in cases where the $p_{target}$ is 20-180 mbar.

The pre-determined target back pressure, $p_{target}$, for the filter may be calculated by:

choosing a desired back pressure for the filter as would be measured by a testing apparatus different to the coating apparatus 1;

establishing a calibration map for converting back pressures measured on the testing apparatus to back pressures measured on the coating apparatus 1; and converting the desired back pressure using the calibration map to establish the pre-determined target back pressure, $p_{target}$.

For example, FIG. 7 shows a first example of a calibration map for converting between back pressures on the coating apparatus 1 (shown on the x-axis and titled 'Inline CFBP) and back pressures on a testing apparatus, in this case a Superflow Flow Bench 1050 available from Superflow of Sussex, WI, USA. Back pressures on both the coating apparatus 1 and the testing apparatus are Cold Flow Back Pressures (CFBP) measured in mbar at a flowrate of 600 $m^3$/hr. As can be seen a linear relationship may be established in this case between the back pressures on both apparatus when measured at the same flowrates. In this example, for the range of CFBP of interest, the present application has found that a calibration map in the form of a linear or quadratic fit may accurately allow conversions of CFBP on the coating apparatus 1 and the testing apparatus. In the example of FIG. 7 the flow rates at which the CFBP was measured were both 600 $M^3$/hr on the coating apparatus 1 and the testing apparatus.

Furthermore, the present applicant has found that a single linear or quadratic fit may accurately allow conversions of CFBP on the coating apparatus 1 and the testing apparatus irrespective of the chosen flow rate or the diameter, length or substrate characteristic of the filter 2, as long as the same chosen flow rate is used on the coating apparatus 1 and the testing apparatus. For example, FIG. 8 illustrates that a calibration map in the form of a single linear or quadratic fit accurately allows for conversion of CFBP for two different filters—labelled Part 1 and Part 2 in FIG. 8. Not only that, but the same linear or quadratic fit applies when both Parts 1 and 2 are tested at a flow rate of 600 $M^3$/hr and when both are tested at 800 $M^3$/hr.

It may be desired to convert between CFBP on the coating apparatus 1 and the testing apparatus where different flow rates are used on each apparatus. The present applicant has discovered that this is possible by using a calibration map that comprises a set of linear or quadratic fit lines. For example, FIG. 9 illustrates a calibration map with two fit lines. The left-most fit line represents conversion of CFBP for two different filters (Part 1 and Part 2) where the flow rate on the coating apparatus 1 and the testing apparatus were both 600 $M^3$/hr. The right-most fit line represents conversion of CFBP for the same Part 1 and Part 2 where the flow rate on the coating apparatus 1 was 800 $M^3$/hr and the flow rate on the testing apparatus was 600 $M^3$/hr. It will be understood that the calibration map may comprise any required number of fit lines for any required combination of coating and testing CFBP.

Use of an offset pressure, $p_{offset}$, as described above may produce improved and acceptable results for the final back pressures of the filters 2. However, the present applicant has discovered that further improvements may be made. For example, the present applicant has discovered that characteristics of the filters 2 may affect the loading of the dry powder and in particular that the rate of loading of the dry powder 4 with respect to time may be affected by characteristics including the pore size of the filter 2, porosity, wall thickness and/or cell density of the filter 2. Consequently, using a fixed offset pressure, $p_{offset}$, as described above may still lead to some variation in the final back pressures obtained. This is illustrated in FIG. 10 which shows the powder loading phase for 8 filters 2 that have differing pore sizes. As can be seen, the gradient of the back pressure-time response curves differ between filters. Thus, use of a fixed offset pressure would not obtain a uniform final back pressure for all 8 filters 2. For the 8 example filters of FIG. 10, the final obtained back pressures had a mean back pressure of 64.5 mbar (compared to a target of 63 mbar) and a standard deviation of 1.2 mbar.

Figure 11:
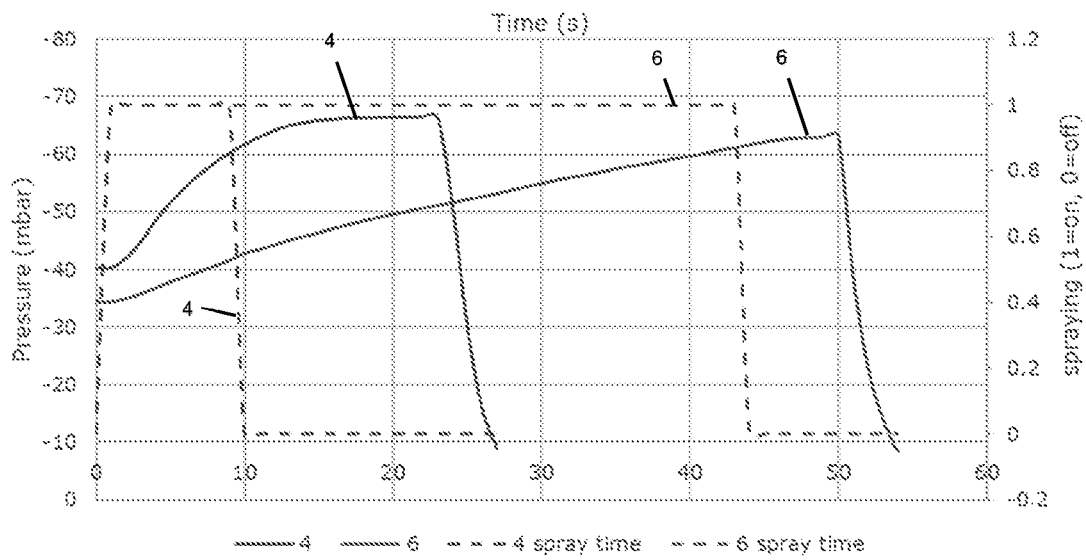
FIG. 11 shows a graph showing back pressure against time for two of the eight filters of FIG. 10.
Figure 12:
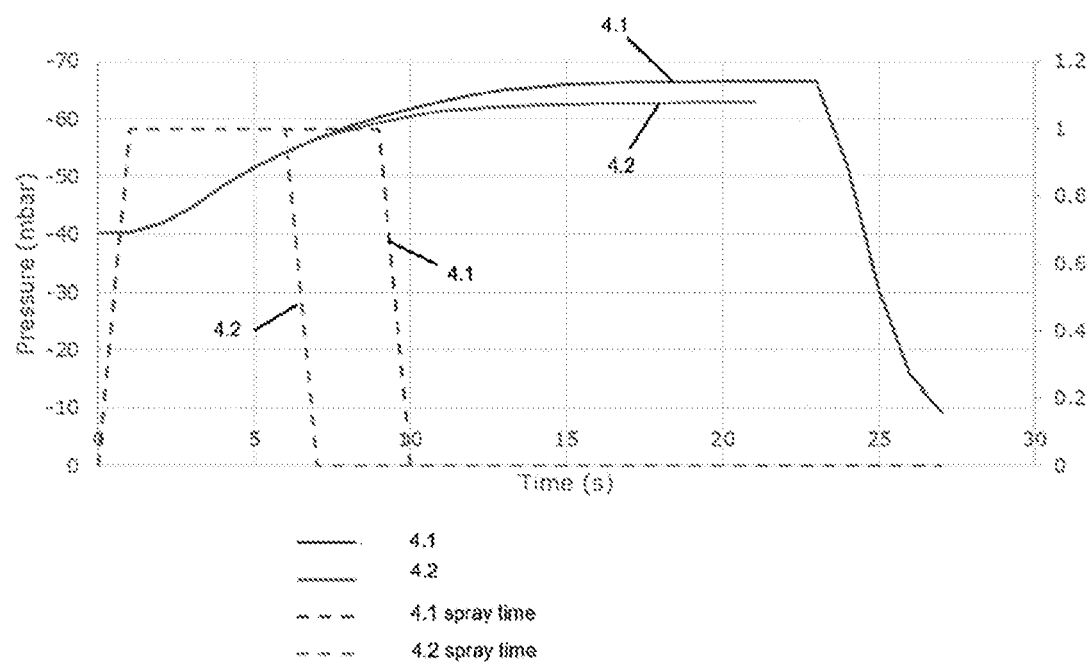
FIG. 12 is a graph showing back pressure for one of the eight filters of FIG. 10 subjected to two different regimes for spraying the dry powder.

For example, FIG. 11 illustrates this using, by way of example, filter numbers 4 and 6 from FIG. 10. In both cases the spraying of the dry powder 4 is stopped when the filter reaches 60 mbar (a target back pressure of 63 mbar minus an offset pressure of 3 mbar). Filter number 6 has a relatively shallow gradient of its response curve (i.e. it requires a relatively large amount of powder for each mbar increase in back pressure) and the final obtained back pressure is closely aligned to the target at 63.1 mbar. However, Filter number 4 has a steeper gradient of its response curve (i.e. it requires a relatively small amount of powder for each mbar increase in back pressure) and the final obtained back pressure overshoots the target and reaches 66.6 mbar.

Consequently, the present applicant has discovered that an improved method of treatment may be achieved by, in Step S29-5, monitoring a back pressure of the filter 2 during spraying of the dry powder 4 and stopping the spraying of the dry powder towards the inlet face of the filter 2 when:

$$p_{est} \geq p_{target}$$

where, $p_{target}$ is a pre-determined target back pressure for the filter; and $p_{est}$ is an estimated final back pressure of the filter;

wherein $p_{est}$ is calculated by extrapolation of measured back pressure data for the filter that is obtained during spraying of the dry powder 4.

The estimated final back pressure of the filter, $p_{est}$, may be calculated by extrapolating the measured back pressure data forwards in time for $T_s$ seconds, where $T_s$ is a settling time.

The method may be performed on the coating apparatus 1 and the settling time, $T_s$, may be a coating apparatus-dependent variable and may be preferably independent of the filter 2. The parameter of the setting time, $T_s$, may be chosen to characterise the performance of the coating apparatus 1. The setting time, $T_s$, may be calculated theoretically for a coating apparatus 1. Alternatively, the setting time, $T_s$, may be determined experimentally for a coating apparatus 1 by testing sample filters. For example experiments may be carried out iteratively to obtain a good estimate of the settling time.

The estimated final back pressure of the filter 2, $p_{est}$, may be calculated by curve-fitting the measured back pressure data and extrapolating the fitted curve forwards in time. For example, during initial loading of the filter 2 with the dry powder 4, back pressure measurements may be taken, preferably at a high sampling rate. The processor 9 (or other computational resource) may then calculate a fit line that matches the recorded back pressure data and then use the fit line to extrapolate forwards in time. In some examples the fit line may be a quadratic fit line that fits all or a major proportion of the recorded back pressure measurements. In other examples the fit line may be a linear fit line that matches a current or recent portion of the recorded back pressure measurements.

FIG. 12 illustrates the application of the method to the filter number 4 referred to in FIG. 11. The settling time, $T_s$, was calculated from examination of the results of the 8 filters in FIG. 10 as 3.5 seconds for the coating apparatus 1 used.

In FIG. 12, 4.1 refers to the filter number 4 as treated using a fixed offset pressure as described above with reference to FIG. 11. As noted above, the powder spraying was stopped when the filter reached a back pressure of 60 mbar (a target back pressure of 63 mbar minus an offset pressure of 3 mbar) and the final obtained back pressure overshoots the target and reaches 66.6 mbar.

The results marked 4.2 show the effect of using the improved method of extrapolating the measured back pressure data forwards in time for $T_s$ seconds, i.e. 3.5 seconds in this example. As can be seen the final obtained back pressure was 62.8 mbar, very close to the target of 63 mbar. For the 8 example filters of FIG. 10, the improved method can obtain final back pressures with a mean back pressure of 63.7 mbar (compared to a target of 63 mbar) and a standard deviation of 0.85 mbar, significantly improved compared to the results of the method using a fixed offset pressure.

According to the present disclosure a treated filter may be provided having one or more advantages compared to prior art filters. Preferably, but not exclusively, the treated filter may be treated according to the method of the present disclosure and or treated using the apparatus according to the present disclosure.

Further aspects and embodiments of the present disclosure are set out in the following clauses:

Clause A1. A method for treating a filter for filtering particulate matter from exhaust gas, the method comprising the steps of:

a) containing a dry powder in a reservoir;

b) locating a filter in a filter holder, the filter comprising a porous substrate having an inlet face and an outlet face, the inlet face and the outlet face being separated by a porous structure;

c) establishing a primary gas flow through the porous structure of the filter by applying a pressure reduction to the outlet face of the filter;

d) transferring the dry powder from the reservoir to a spray device located upstream of the inlet face of the filter;

e) spraying the dry powder, using the spray device, towards the inlet face of the filter such that the dry powder is entrained in the primary gas flow and passes through the inlet face of the filter to contact the porous structure; and f) monitoring a back pressure of the filter during at least step e) and stopping the spraying of the dry powder towards the inlet face of the filter when:

$$p_{BP} \geq p_{target} - p_{offset}$$

where, $p_{BP}$ is the back pressure of the filter;

$p_{target}$ is a pre-determined target back pressure for the filter; and $p_{offset}$ is a pre-chosen offset pressure.

Clause A2. The method of clause A1, wherein, in step f), the spraying of the dry powder towards the inlet face of the filter is stopped when $p_{BP} \geq p_{target} - p_{offset}$ is true for a minimum time period, $t_{min}$, wherein $t_{min} \geq 0.1$ s, optionally $\geq 0.5$ s, optionally $\geq 1.0$ s.

Clause A3. The method of clause A1 or clause A2, where $p_{offset}$ is 1-10 mbar, optionally 2-5 mbar, optionally 3-5 mbar.

Clause A4. The method of any preceding clause, wherein, in step f), the back pressure of the filter is monitored continuously during at least step e); and optionally wherein the back pressure is continuously monitored by measuring the back pressure at a sample rate of $\geq 1$ samples·s$^{-1}$, optionally $\geq 5$ samples·s$^{-1}$, optionally $\geq 10$ samples·s$^{-1}$.

Clause A5. The method of any preceding clause, further comprising in step c), monitoring a back pressure of the filter and passing the primary gas flow through the porous structure of the filter until the back pressure of the filter is stable before starting step d).

Clause A6. The method of clause A5, wherein the pre-determined target back pressure for the filter, $p_{target}$, is relative to the stable back pressure monitored in step c).

Clause A7. The method of any preceding clause, further comprising the step:
g) monitoring the back pressure of the filter and maintaining the primary gas flow through the porous structure of the filter after the spraying of the dry powder has been stopped until the back pressure of the filter is stable.

Clause A8. The method of any one of clauses A5 to A7, wherein the back pressure of the filter is considered stable when:
i) the primary gas flow rate is within 0.5% of a predetermined flow rate;
ii) the first derivative of the primary gas flow rate is $\leq \pm 0.15$ m$^3$ hr$^{-1}$·s$^{-1}$; and
iii) the first derivative of the back pressure of the filter is $\leq \pm 1.5$ mbar·s$^{-1}$.

Clause A9. The method of any preceding clause, wherein the back pressure, $p_{BP}$, is an absolute back pressure measured relative to atmospheric pressure.

Clause A10. The method of any preceding clause, wherein the method uses a coating apparatus for carrying out at least steps a) to f), wherein the pre-determined target back pressure, $p_{target}$, for the filter is calculated by:
choosing a desired back pressure for the filter as would be measured by a testing apparatus different to the coating apparatus;
establishing a calibration map for converting back pressures measured on the testing apparatus to back pressures measured on the coating apparatus; and
converting the desired back pressure using the calibration map to establish the pre-determined target back pressure, $p_{target}$.

Clause B1. A method for treating a filter for filtering particulate matter from exhaust gas, the method comprising the steps of:
a) containing a dry powder in a reservoir;
b) locating a filter in a filter holder, the filter comprising a porous substrate having an inlet face and an outlet face, the inlet face and the outlet face being separated by a porous structure;
c) establishing a primary gas flow through the porous structure of the filter by applying a pressure reduction to the outlet face of the filter while monitoring a back pressure of the filter, and passing the primary gas flow through the porous structure of the filter until the back pressure of the filter is stable;
d) subsequently to establishing the stable back pressure of the filter, transferring the dry powder from the reservoir to a spray device located upstream of the inlet face of the filter;
e) spraying the dry powder, using the spray device, towards the inlet face of the filter such that the dry powder is entrained in the primary gas flow and passes through the inlet face of the filter to contact the porous structure while monitoring the back pressure of the filter;
f) stopping the spraying of the dry powder towards the inlet face of the filter; and
g) continuing to monitor the back pressure of the filter while maintaining the primary gas flow through the porous structure of the filter after the spraying of the dry powder has been stopped until the back pressure of the filter is stable.

Clause B2. The method of clause B1, wherein the back pressure of the filter is considered stable when the first derivative of the primary gas flow rate is $\leq \pm X$ m$^3$ hr$^{-1}$·s$^{-1}$, wherein X=0 to 0.30, optionally X=0.10 to 0.20, X=0.15.

Clause B3. The method of clause B1 or clause B2, wherein the back pressure of the filter is considered stable when the first derivative of the back pressure of the filter is $\leq \pm Y$ mbar·s$^{-1}$, wherein Y=0.5 to 3.0, optionally Y=1.0 to 2.0, optionally Y=1.5.

Clause B4. The method of any one of clauses B1 to B3, wherein the back pressure of the filter is considered stable when the primary gas flow rate is within Z % of a predetermined flow rate, wherein Z=1.5, optionally Z=1.0, optionally Z=0.5.

Clause B5. The method of any one of clauses B1 to B4, wherein the back pressure is an absolute back pressure measured relative to atmospheric pressure.

Clause C1. The method of any one of clauses A1 to A10 or B1 to B5, wherein the back pressure of the filter is measured using a pressure sensor; optionally a single pressure sensor that is located in a filter holder or other housing fluidly connected to the outlet face of the filter.

Clause D1. A method for treating a filter for filtering particulate matter from exhaust gas, the method comprising the steps of:
a) containing a dry powder in a reservoir;
b) locating a filter in a filter holder, the filter comprising a porous substrate having an inlet face and an outlet face, the inlet face and the outlet face being separated by a porous structure;
c) establishing a primary gas flow through the porous structure of the filter by applying a pressure reduction to the outlet face of the filter;
d) transferring the dry powder from the reservoir to a spray device located upstream of the inlet face of the filter;
e) spraying the dry powder, using the spray device, towards the inlet face of the filter such that the dry powder is entrained in the primary gas flow and passes through the inlet face of the filter to contact the porous structure; and
f) monitoring a back pressure of the filter during at least step e) and stopping the spraying of the dry powder towards the inlet face of the filter when:

$$p_{est} \geq p_{target}$$

where,
$p_{target}$ is a pre-determined target back pressure for the filter; and
$p_{est}$ is an estimated final back pressure of the filter;

wherein $p_{est}$ is calculated by extrapolation of measured back pressure data for the filter that is obtained during step f).

Clause D2. The method of clause D1, wherein $p_{est}$ is calculated by extrapolating the measured back pressure data forwards in time for $T_s$ seconds, where $T_s$ is a settling time.

Clause D3. The method of clause D2, wherein the method is performed on a coating apparatus and the settling time, $T_s$, is a coating apparatus-dependent variable and is preferably independent of the filter.

Clause D4. The method of any one of clauses D1 to D3, wherein $p_{est}$ is calculated by curve-fitting the measured back pressure data and extrapolating the fitted curve forwards in time.

Clause E1. The method of any one of clauses A1 to A10 or clauses B1 to B5 or clauses C1 to C2 or clauses D1 to D4, wherein the dry powder comprises or consists of:
a) a metal compound for forming by thermal decomposition a metal oxide;
b) a metal oxide; or
c) an aerogel.

Clause E2. The method of clause E1, wherein the metal compound comprises or consists of a metal hydroxide, a metal phosphate, a metal carbonate, a metal sulphate, a metal perchlorate, a metal iodide, a metal oxalate, a metal acetate, a metal chlorate or a mixture thereof.

Clause E3. The method of clause E1 or E2, wherein the metal of the metal compound comprises or consists of one or more of magnesium, calcium, strontium, barium, aluminium, zirconium, manganese, lithium, iron, cobalt, nickel, copper, or gallium.

Clause E4. The method of any one of clauses E1 to E3, wherein the metal oxide of option c) comprises one or more fumed metal oxides or fumed mixed oxides, for example fumed alumina, fumed silica, or fumed titania.

Clause E5. The method of any one of clauses E1 to E4, wherein the aerogel comprises one or more of silica aerogel, alumina aerogel, carbon aerogel, titania aerogel, zirconia aerogel, ceria aerogel, a metal oxide aerogel and mixed oxide aerogels.

Clause E6. The method of any one of clauses E1 to E5, wherein the dry powder has a tapped density of 1 to 3 g/cm$^3$, optionally 1.5 to 2.5 g/cm$^3$, optionally about 2 g/cm$^3$; or the dry powder has a tapped density of less than 0.10 g/cm$^3$, optionally less than 0.08 g/cm$^3$, optionally less than 0.07 g/cm$^3$, optionally less than 0.06 g/cm$^3$, optionally less than 0.05 g/cm$^3$.

Clause E7. The method of any one of clauses E1 to E6, wherein the dry powder has a d50 (by volume) less than 10 microns, optionally less than 5 microns, optionally about 2 microns.

Clause E8. The method of any one of clauses E1 to E7, comprising providing a maximum loading of the filter of 10 to 40 g/l, optionally 15 to 30 g/l, optionally about 20 g/l of the dry powder; or providing a maximum loading of the filter of <10 g/l of the dry powder, optionally <5 g/l of the dry powder, optionally <2 g/l of the dry powder.

Clause E9. The method of any one of clauses E1 to E8, further comprising before step b) coating the filter with a washcoat, preferably a catalyst washcoat.

Clause F1. The method of any preceding clause, further comprising the step of calcining the filter after loading with the dry powder.

Clause F2. The method of clause F1, wherein the calcining is at a temperature of at least 150° C., optionally at least 250° C., optionally at least 500° C.

Clause F3. The method of clause F1 or clause F2, wherein the calcining is at a temperature no greater than 550° C.; alternatively at a temperature greater than 550° C.; optionally at a temperature up to 900° C.; optionally at a temperature up to 1150° C.

Clause F4. The method of any one of clauses F1 to F3, wherein the calcining is carried out for a period of 30 to 90 minutes, optionally 30 to 60 minutes and including a dwell time of 1 to 15 minutes, preferably 5 to 10 minutes.

Clause G1. The method of any preceding clause, wherein in step d) a secondary gas flow, separate to the primary gas flow, is used to transfer the dry powder from the reservoir to the spray device; and optionally the secondary gas flow is controllable independently of the primary gas flow.

Clause G1. The method of clause G1, wherein the secondary gas flow comprises a flow of compressed gas, preferably air.

Clause G2. The method of clause G1 or clause G2, wherein the secondary gas flow is applied as a single burst or a plurality of intermittent bursts.

Clause G3. The method of any preceding clause, comprising using a vacuum generator to establish the primary gas flow through the porous structure of the filter.

Clause G4. The method of clause G3, wherein a level of the pressure reduction generated by the vacuum generator is controllable independently of a speed or mass rate of the transfer of the dry powder from the reservoir to the spray device.

Clause G5. The method of any preceding clause, wherein the primary gas flow has a volumetric flow rate of 10 m$^3$/hr to 5,000 m$^3$/hr, preferably 400 m$^3$/hr to 2,000 m$^3$/hr, preferably 600 m$^3$/hr to 1000 m$^3$/hr.

Clause G6. The method of clause G5, further comprising using a pressure sensor, preferably a single pressure sensor, to monitor the back pressure.

Clause G7. The method of clause G6, wherein the pressure sensor, preferably the single pressure sensor, is located in a filter holder or other housing fluidly connected to the outlet face of the filter.

Clause G8. The method of clause G6 or clause G7, wherein the same pressure sensor, preferably the same single pressure sensor, is used to monitor the back pressure of the filter during at least steps c) and f).

Clause G9. The method of any preceding clause, wherein in step e) the dry powder is sprayed from one or more outlets of the spray device.

Clause G10. The method of clause G9, wherein the one or more outlets of the spray device comprise an aperture size of 1 to 10 mm, optionally 0.5 to 5.0 mm, optionally 1.0 to 2.5 mm, optionally 1.0 to 2.0 mm.

Clause G11. The method of clause G9 or clause G10, wherein the dry powder is sprayed from one or more fixed outlets of the spray device.

Clause G12. The method of clause G9 or clause G10, wherein the dry powder is sprayed from one or more mobile outlets of the spray device, preferably from one or more oscillating outlets.

Clause G13. The method of any preceding clause, further comprising in step e) channelling the dry powder from the spray device to the inlet face of the filter within a flow conduit.

Clause G14. The method of clause G13, wherein the flow conduit provides an unimpeded flow path between the spray device and the inlet face of the filter.

Clause G15. The method of clause G13, wherein the flow conduit comprises a flow conditioner interposed between the spray device and the inlet face of the filter, the flow conditioner acting to promote dispersion of the dry powder within the gas flow.

Clause G16. The method of clause G15, wherein the flow conditioner comprises one or more of a static mixer, a mesh, a sieve, a baffle, and an orificed plate.

Clause G17. The method of any preceding clause, wherein the inlet face of the filter is located from 10 to 80 cm, preferably 15 to 20 cm from the spray device, and or the spray device is located at a distance from the inlet face of the filter that is up to 4 times a diameter of the inlet face of the filter.

Clause G18. The method of any preceding clause, further comprising in step d) dosing the dry powder from the reservoir.

Clause G19. The method of clause G18, wherein the dosing comprises dosing by one or more of by weight, by volume, by particle number, by time.

Clause G20. The method of clause G18 or clause G19, comprising gravimetrically feeding a dosing device with the dry powder.

Clause G21. The method of any one of clauses G18 to G20, wherein the dosing uses a loss in weight feeder.

Clause G22. The method of any preceding clause, wherein in step a) the dry powder is contained in one or more hoppers.

Clause G23. The method of any preceding clause, wherein in step b) the filter is located in the holder in a vertical orientation with the inlet face uppermost.

Clause G24. The method of clause G23, wherein in step d) the spray device is located vertically above the inlet face; and preferably a spray direction of the spray device is co-axial with a longitudinal axis of the filter; and preferably the spray direction and the longitudinal axis are coincident.

Clause G25. The method of any preceding clause, wherein the porous substrate is a wall-flow filter.

Clause H1. A filter obtainable by the method of any preceding clause.

Clause H2. The filter of clause H1 which is one or more of a catalysed soot filter (CSF), a selective catalytic reduction filter (SCRF), a lean NOx trap filter (LNTF), and a gasoline particulate filter (GPF).

The invention claimed is:

1. A method for treating a filter for filtering particulate matter from exhaust gas, the method comprising the steps of:
   a) containing a dry powder in a reservoir;
   b) locating a filter in a filter holder, the filter comprising a porous substrate having an inlet face and an outlet face, the inlet face and the outlet face being separated by a porous structure;
   c) establishing a primary gas flow through the porous structure of the filter by applying a pressure reduction to the outlet face of the filter;
   d) transferring the dry powder from the reservoir to a spray device located upstream of the inlet face of the filter;
   e) spraying the dry powder, by use of the spray device, towards the inlet face of the filter such that the dry powder is entrained in the primary gas flow and passes through the inlet face of the filter to contact the porous structure; and
   f) monitoring a back pressure of the filter during at least step e) and stopping the spraying of the dry powder towards the inlet face of the filter when:

$$p_{BP} \geq p_{target} - p_{offset}$$

where, $p_{BP}$ is the back pressure of the filter;
   $p_{target}$ is a pre-determined target back pressure for the filter; and
   $p_{offset}$ is a pre-chosen offset pressure.

2. The method of claim 1, wherein, in step f), the spraying of the dry powder towards the inlet face of the filter is stopped when $p_{BP} \geq p_{target} - p_{offset}$ is true for a minimum time period, $t_{min}$, wherein $t_{min} \geq 0.5$ s.

3. The method of claim 1, wherein $p_{offset}$ is 2-5 mbar.

4. The method of claim 1, wherein, in step f), the back pressure of the filter is monitored continuously during at least step e) by measuring the back pressure at a sample rate of ≥1 sample per second.

5. The method of claim 1, further comprising in step c), monitoring a back pressure of the filter and passing the primary gas flow through the porous structure of the filter until the back pressure of the filter is stable before starting step d);

wherein the back pressure of the filter is stable when
   i) the primary gas flow rate is within 0.5% of a predetermined flow rate;
   ii) the first derivative of the primary gas flow rate is $\leq +0.15$ m$^3$ hr$^{-1}$·s$^{-1}$; and
   iii) the first derivative of the back pressure of the filter is $\leq +1.5$ mbar·s$^{-1}$.

6. The method of claim 5, wherein the pre-determined target back pressure for the filter, $p_{target}$, is relative to the stable back pressure monitored in step c).

7. The method of claim 1, further comprising the step:
   g) monitoring the back pressure of the filter and maintaining the primary gas flow through the porous structure of the filter after the spraying of the dry powder has been stopped until the back pressure of the filter is stable,
   wherein the back pressure of the filter is considered stable when:
   i) the primary gas flow rate is within 0.5% of a predetermined flow rate;
   ii) the first derivative of the primary gas flow rate is $\leq \pm 0.15$ m$^3$ hr$^{-1}$·s$^{-1}$; and
   iii) the first derivative of the back pressure of the filter is $\leq \pm 1.5$ mbar·s$^{-1}$.

8. The method of claim 1, wherein the back pressure, $p_{BP}$, is an absolute back pressure measured relative to atmospheric pressure.

9. The method of claim 1, wherein the pre-determined target back pressure, $p_{target}$, for the filter is calculated by:
   choosing a desired back pressure for the filter as would be measured by a testing apparatus different to the coating apparatus;
   establishing a calibration map for converting back pressures measured on the testing apparatus to back pressures measured on the coating apparatus; and
   converting the desired back pressure using the calibration map to establish the pre-determined target back pressure, $p_{target}$.

10. The method of claim 1, further comprising the step of calcining the filter after loading with the dry powder.

11. The method of claim 1, further comprising before step b) coating the filter with a catalyst washcoat.

12. The method of claim 1, comprising providing a maximum loading of the filter of 10 to 40 g/l of the dry powder.

13. The method of claim 1, wherein the dry powder has a tapped density of 1 to 3 g/cm$^3$.

14. The method of claim 1, wherein the dry powder has a d50 (by volume) less than 10 microns.

15. The method of claim 1, wherein in step d) a secondary gas flow, separate to the primary gas flow, is used to transfer the dry powder from the reservoir to the spray device.

16. A method for treating a filter for filtering particulate matter from exhaust gas, the method comprising the steps of:
   a) containing a dry powder in a reservoir;
   b) locating a filter in a filter holder, the filter comprising a porous substrate having an inlet face and an outlet face, the inlet face and the outlet face being separated by a porous structure;
   c) establishing a primary gas flow through the porous structure of the filter by applying a pressure reduction to the outlet face of the filter while monitoring a back pressure of the filter, and passing the primary gas flow through the porous structure of the filter until the back pressure of the filter is stable;
   d) subsequently to establishing the stable back pressure of the filter, transferring the dry powder from the reservoir to a spray device located upstream of the inlet face of the filter;
   e) spraying the dry powder, by use of the spray device, towards the inlet face of the filter such that the dry powder is entrained in the primary gas flow and passes through the inlet face of the filter to contact the porous structure while monitoring the back pressure of the filter;
   f) stopping the spraying of the dry powder towards the inlet face of the filter; and
   g) continuing to monitor the back pressure of the filter while maintaining the primary gas flow through the porous structure of the filter after the spraying of the dry powder has been stopped until the back pressure of the filter is stable.

17. A method for treating a filter for filtering particulate matter from exhaust gas, the method comprising the steps of:
   a) containing a dry powder in a reservoir;
   b) locating a filter in a filter holder, the filter comprising a porous substrate having an inlet face and an outlet face, the inlet face and the outlet face being separated by a porous structure;
   c) establishing a primary gas flow through the porous structure of the filter by applying a pressure reduction to the outlet face of the filter;
   d) transferring the dry powder from the reservoir to a spray device located upstream of the inlet face of the filter;
   e) spraying the dry powder, by use of the spray device, towards the inlet face of the filter such that the dry powder is entrained in the primary gas flow and passes through the inlet face of the filter to contact the porous structure; and
   f) monitoring a back pressure of the filter during at least step e) and stopping the spraying of the dry powder towards the inlet face of the filter when:

$$p_{est} \geq p_{target}$$

where,
$p_{target}$ is a pre-determined target back pressure for the filter; and
$p_{est}$ is an estimated final back pressure of the filter;
wherein $p_{est}$ is calculated by extrapolation of measured back pressure data for the filter that is obtained during step f).

* * * * *